United States Patent
Yang et al.

(10) Patent No.: US 9,444,568 B2
(45) Date of Patent: Sep. 13, 2016

(54) METHOD FOR TRANSMITTING CONTROL INFORMATION AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 14/122,563

(22) PCT Filed: Sep. 24, 2012

(86) PCT No.: PCT/KR2012/007675
§ 371 (c)(1),
(2) Date: Nov. 26, 2013

(87) PCT Pub. No.: WO2013/043022
PCT Pub. Date: Mar. 28, 2013

(65) Prior Publication Data
US 2014/0126433 A1 May 8, 2014

Related U.S. Application Data

(60) Provisional application No. 61/538,140, filed on Sep. 23, 2011, provisional application No. 61/593,833, filed on Feb. 1, 2012, provisional application No. 61/671,106, filed on Jul. 13, 2012, provisional application No. 61/679,053, filed on Aug. 2, 2012.

(51) Int. Cl.
*H04J 3/16* (2006.01)
*H04L 1/00* (2006.01)
(Continued)

(52) U.S. Cl.
CPC ........... *H04J 3/1694* (2013.01); *H04L 1/0027* (2013.01); *H04L 1/0026* (2013.01); *H04L 5/001* (2013.01); *H04L 5/14* (2013.01)

(58) Field of Classification Search
None
See application file for complete search history.

(56) References Cited

U.S. PATENT DOCUMENTS

2010/0234037 A1 9/2010 Terry et al.
2011/0013581 A1 1/2011 Lee et al.
(Continued)

FOREIGN PATENT DOCUMENTS

CN 101977099 A 2/2011
CN 102017464 A 4/2011
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures, (Release 10)", 3GPP TS 36.213 V10.2.0, Jun. 2011, pp. 1-120.

*Primary Examiner* — Hassan Kizou
*Assistant Examiner* — Roberta A Shand
(74) *Attorney, Agent, or Firm* — Birch, Stewart, Kolasch & Birch, LLP

(57) ABSTRACT

The present invention relates to a wireless communication system. More particularly, the present invention relates to a method and an apparatus for transmitting uplink control information in the wireless communication system, which supports carrier aggregation and operates by a TDD, and comprises the steps of: receiving periodic information for reporting CSI; generating A/N information with respect to at least one cell from a plurality of cells to transmit from an uplink subframe n; and performing an action for transmitting the CSI information from the uplink subframe n according to the periodic information, wherein the CSI information and the A/N information are transmitted from the uplink subframe n through the same physical channel when a specific condition is satisfied, and only the A/N information is transmitted from the uplink subframe n when the specific condition is not satisfied, wherein the specific condition is Mp=0, and the A/N information comprising only A/N with respect to a first piece of specific downlink data that is received through a specific SCell, wherein the Mp expresses the number of downlink subframes that corresponds to the uplink subframe n with respect to a PCell.

14 Claims, 15 Drawing Sheets

(51) Int. Cl.
  *H04L 5/00* (2006.01)
  *H04L 5/14* (2006.01)

(56) References Cited

U.S. PATENT DOCUMENTS

| | | |
|---|---|---|
| 2011/0044391 A1 | 2/2011 | Ji et al. |
| 2011/0116464 A1 | 5/2011 | Ishii et al. |
| 2011/0249578 A1* | 10/2011 | Nayeb Nazar et al. ...... 370/252 |
| 2012/0008580 A1 | 1/2012 | Lee et al. |
| 2012/0039280 A1* | 2/2012 | Chen et al. ............... 370/329 |
| 2012/0120817 A1* | 5/2012 | Khoshnevis et al. ........ 370/252 |
| 2012/0127950 A1 | 5/2012 | Chung et al. |
| 2012/0210187 A1* | 8/2012 | Yin et al. .................... 714/751 |
| 2012/0213187 A1 | 8/2012 | Yang et al. |
| 2013/0114472 A1* | 5/2013 | Tamaki et al. ............. 370/280 |

FOREIGN PATENT DOCUMENTS

| | | |
|---|---|---|
| CN | 102104458 A | 6/2011 |
| KR | 10-0987458 B1 | 10/2010 |
| KR | 10-2011-0020719 A | 3/2011 |
| KR | 10-2011-0046288 A | 5/2011 |
| WO | WO 2011/021830 A2 | 2/2011 |

\* cited by examiner

METHOD FOR TRANSMITTING CONTROL INFORMATION AND APPARATUS FOR SAME

CROSS REFERENCE TO RELATED APPLICATIONS

This application is the National Phase of PCT/KR2012/007675 filed on Sep. 24, 2012, which claims priority under 35 U.S.C. 119(e) to U.S. Provisional Application Nos. 61/538,140 filed on Sep. 23, 2011, 61/593,833 filed on Feb. 1, 2012, 61/671,106 filed on Jul. 13, 2012, and 61/679,053 filed on Aug. 2, 2012, all of which are hereby expressly incorporated by reference in the present application.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting control information in a wireless communication system and an apparatus for the same. Another object of the present invention is to provide a method and apparatus for efficiently transmitting uplink control information in a time division duplexing (TDD) system and efficiently managing resources for the same. The technical problems solved by the present invention are not limited to the above technical problems and those skilled in the art may understand other technical problems from the following description.

Technical Solution

The object of the present invention can be achieved by providing a method for transmitting uplink control information in a wireless communication system supporting carrier aggregation and operating in TDD, the method including: receiving period information for CSI reporting; generating A/N (acknowledgement/negative ACK) information about one or more cells from among a plurality of cells for transmission in an uplink subframe n; and performing an operation of transmitting CSI in the uplink subframe n according to the period information, wherein the CSI and the A/N information are transmitted through the same physical channel in the uplink subframe n when a specific condition is satisfied, and only the A/N information is transmitted in the uplink subframe n when the specific condition is not satisfied, wherein the specific condition includes Mp=0 and the A/N information comprising only A/N with respect to first specific downlink data received through a specific secondary cell (SCell), wherein Mp represents the number of downlink subframes corresponding to the uplink subframe n with respect to a primary cell (PCell).

In another aspect of the present invention, provided herein is a communication device configured to transmit uplink control information in a wireless communication system supporting carrier aggregation and operating in TDD, including: a radio frequency (RF) unit; and a processor, wherein the processor is configured to receive period information for CSI reporting, to generate A/N information about one or more cells from among a plurality of cells for transmission in an uplink subframe n and to perform an operation of transmitting CSI in the uplink subframe n according to the period information, wherein the CSI and the A/N information are transmitted through the same physical channel in the uplink subframe n when a specific condition is satisfied, and only the A/N information is transmitted in the uplink subframe n when the specific condition is not satisfied, wherein the specific condition includes Mp=0 and the A/N information comprising only A/N with respect to first specific downlink data received through a specific SCell, wherein Mp represents the number of downlink subframes corresponding to the uplink subframe n with respect to a PCell.

The specific condition may include Mp≠0 and the A/N information composed of A/N for second specific downlink data received through the PCell, and the first specific downlink data and the second specific downlink data may include downlink data corresponding to an initial DAI value or having no DAI value corresponding thereto.

The specific SCell may correspond to an SCell having a lowest cell index from among a plurality of SCell.

The specific SCell may correspond to an SCell having a lowest cell index from among a plurality of SCell having numbers of downlink subframes corresponding to the subframe n, which are not 0.

When the specific condition is satisfied, the CSI and A/N information may be transmitted using a first PUCCH format.

When the specific condition is not satisfied, only the A/N information may be transmitted using a second PUCCH format different from the first PUCCH format.

The plurality of cells may have different UL-DL configurations.

Advantageous Effects

According to the present invention, it is possible to efficiently transmit control information in a wireless communication system. Specifically, it is possible to efficiently transmit uplink control information in a TDD system and efficiently manage resources for the same.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
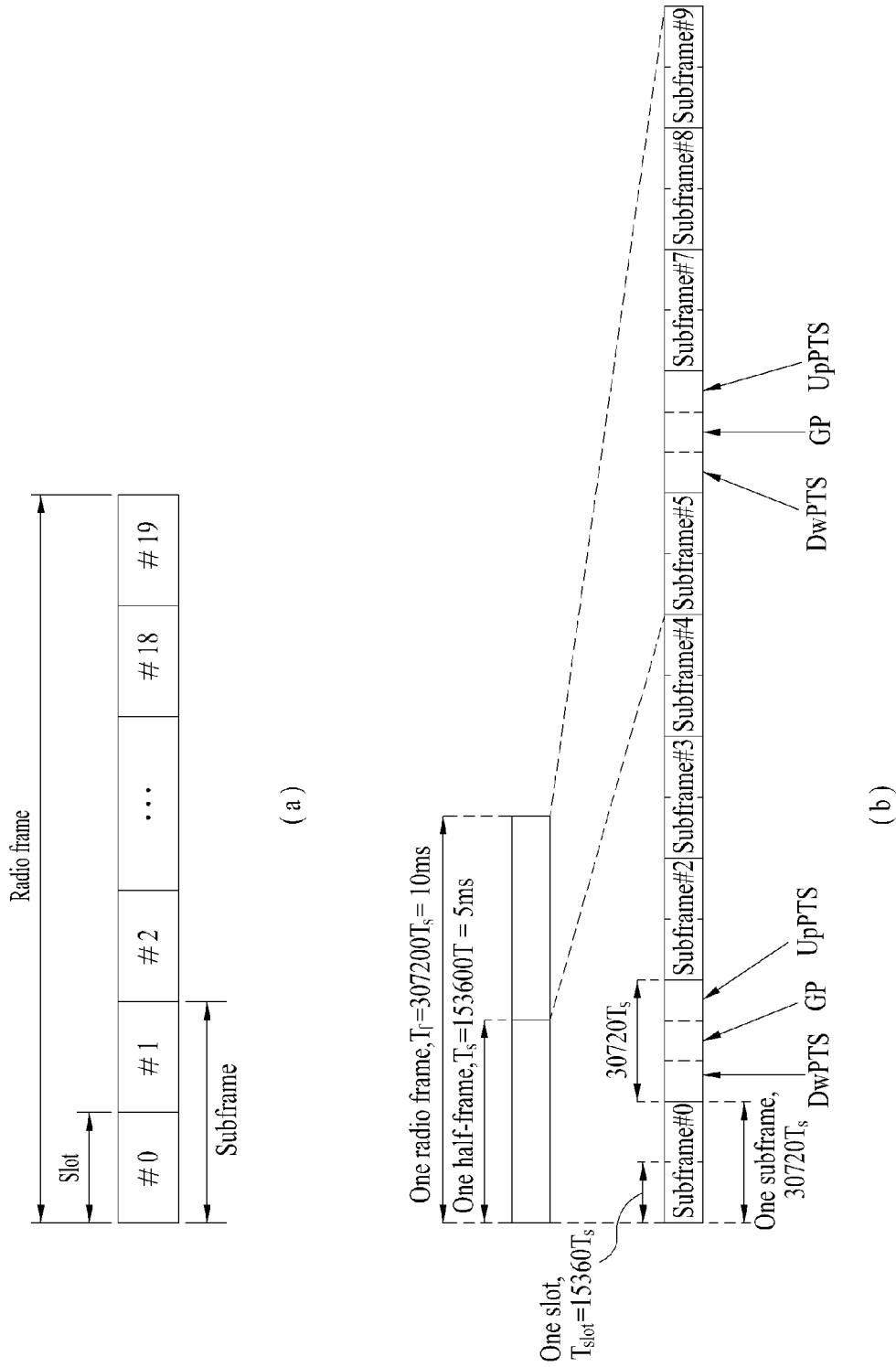
FIG. 1 illustrates a radio frame structure.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

HARQ-ACK (Hybrid Automatic Repeat request-Acknowledgement): this represents an acknowledgment response to downlink transmission (e.g. PDSCH (physical downlink shared channel) or SPS release PDCCH (semi-persistent scheduling release physical downlink control channel)), that is, an ACK (acknowledgement)/NACK (negative ACK)/DTX (discontinuous transmission) response (simply, ACK/NACK response, ACK/NACK, A/N response, A/N). The ACK/NACK/DTX response refers to ACK, NACK, DTX or NACK/DTX. HARQ-ACK for a specific CC or HARQ-ACK of a specific CC refers to an ACK/NACK response to downlink transmission related to (e.g. scheduled for) the corresponding CC. A PDSCH can be replaced by a transport block (TB) or a codeword.

PDSCH: this corresponds to a DL grant PDCCH. The PDSCH is used interchangeably with a PDSCH w/ PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH (physical uplink control channel) index: This corresponds to a PUCCH resource. The PUCCH index represents a PUCCH resource index, for example. The PUCCH resource index is mapped to at least one of an orthogonal cover (OC), a cyclic shift (CS) and a PRB.

ARI (ACK/NACK resource indicator): This is used to indicate a PUCCH resource. For example, the ARI can be used to indicate a resource change value (e.g. offset) with respect to a specific PUCCH resource (configured by a higher layer). Furthermore, the ARI can be used to indicate a specific PUCCH resource (group) index in a PUCCH resource (group) set (configured by a higher layer). The ARI can be included in a TPC field of a PDCCH corresponding to a PDSCH on an SCC. PUCCH power control is performed in a TPC field in a PDCCH (that is, PDCCH corresponding to a PDSCH on a PCC) that schedules the PCC. The ARI can be included in a TPC field of a PDCCH other than a PDCCH that has a downlink assignment index (DAI) initial value and schedules a specific cell (e.g. PCell). The ARI is used interchangeably with a HARQ-ACK resource indication value.

DAI (downlink assignment index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: this represents a PUCCH resource/index linked to the smallest CCE index of a PDCCH that schedules a PCC (refer to Equation 1).

Explicit PUCCH resource: This can be indicated using the AM.

PDCCH scheduling CC: this represents a PDCCH that schedules a PDSCH on a CC, that is, a PDCCH corresponding to a PDSCH on the CC.

PCC (primacy component carrier) PDCCH: this represents a PDCCH that schedules a PCC. That is, the PCC PDCCH indicates a PDCCH corresponding to a PDSCH on the PCC. When it is assumed that cross-carrier scheduling is not allowed for the PCC, the PCC PDCCH is transmitted only on the PCC. The PCC is used interchangeably with a PCell (primary cell).

SCC (secondary component carrier) PDCCH: this represents a PDCCH that schedules an SCC. That is, the SCC PDCCH indicates a PDCCH corresponding to a PDSCH on the SCC. When cross-carrier scheduling is allowed for the SCC, the SCC PDCCH can be transmitted on the PCC. On the other hand, when cross-carrier scheduling is not allowed for the SCC, the SCC PDCCH is transmitted only on the SCC. The SCC is used interchangeably with an SCell (secondary cell).

Cross-CC scheduling: this represents an operation of scheduling/transmitting all PDCCHs through a single PCC.

Non-cross-CC scheduling: This represents an operation of scheduling/transmitting a PDCCH scheduling a CC through the CC.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (frequency division duplex) and a type-2 radio frame structure applicable to TDD (time division duplex).

FIG. 1(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes each of which consists of 2 slots.

Table 1 shows UL-DL (uplink-downlink) configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (downlink pilot timeslot), GP (guard period), and UpPTS (uplink pilot timeslot). DwPTS is a period reserved for downlink transmission and UpPTS is a period reserved for uplink transmission.

Table 2 shows DwPTS/GP/UpPTS lengths according to special subframe configuration. In Table 2, Ts denotes sampling time.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is merely exemplary and the number of subframes included in the radio frame, the number of slots included in a subframe, and the number of symbols included in a slot can be vary.

Figure 2:
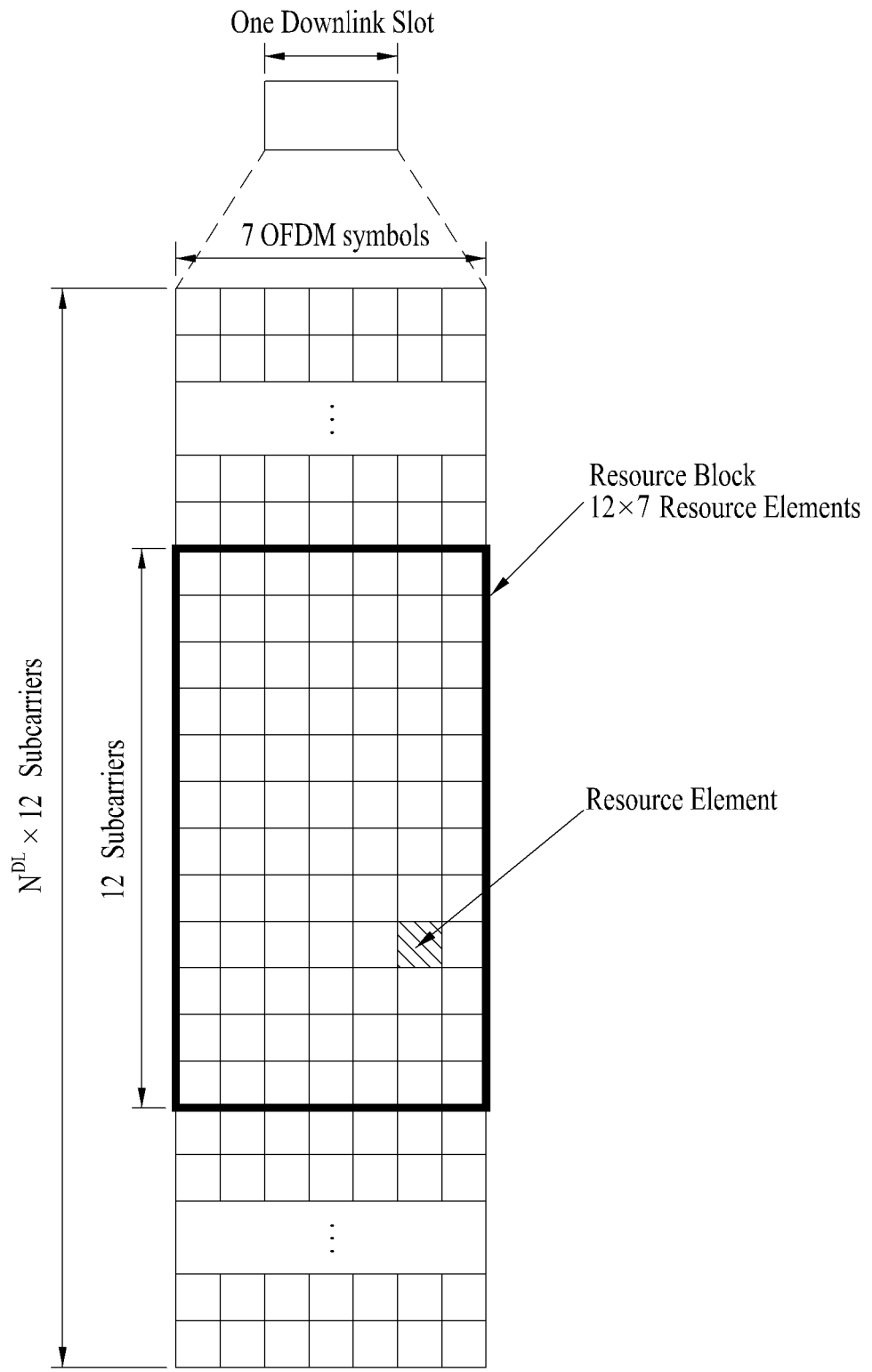
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
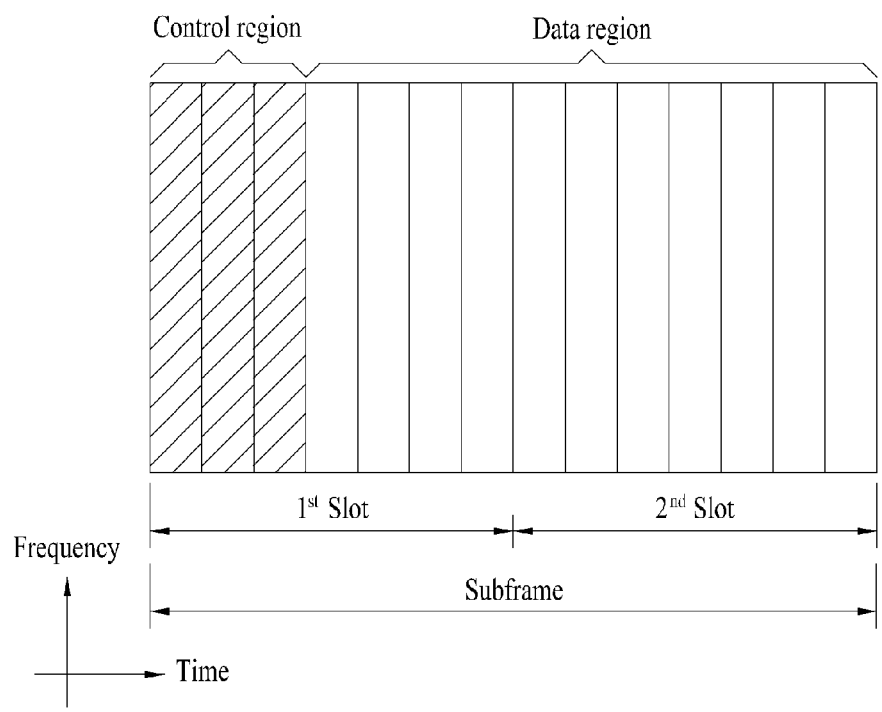
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (modulation coding scheme), RV (redundancy version), NDI (new data indicator), TPC (transmit power control), cyclic shift DMRS (demodulation reference signal), CQI (channel quality information) request, HARQ process number, TPMI (transmitted precoding matrix indicator), PMI (precoding matrix indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
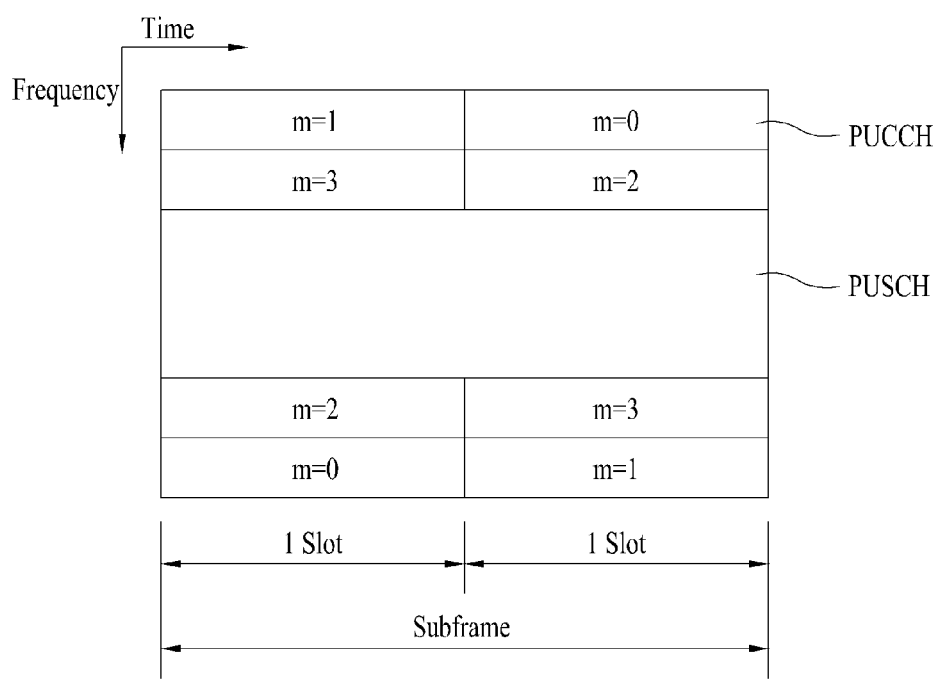
FIG. 4 illustrates an uplink subframe structure.

FIG. 4 illustrates an uplink subframe structure used in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

CQI (channel quality indicator): This is feedback information about a downlink channel. Feedback information regarding multiple input multiple output (MIMO) includes rank indicator (RI) and precoding matrix indicator (PMI). 20 bits are used for each subframe.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

CSI (channel status information) (e.g. CQI) reporting period and frequency of the UE are controlled by the BS. Periodic SCI reporting and aperiodic CSI reporting are supported in the time domain. PUCCH format 2 is used for periodic CSI reporting. However, while a periodic CSI report is transmitted through a PUCCH basically, the CSI report is transmitted on a PUSCH if the PUSCH is scheduled for a subframe reserved for CSI transmission.

Figure 5:
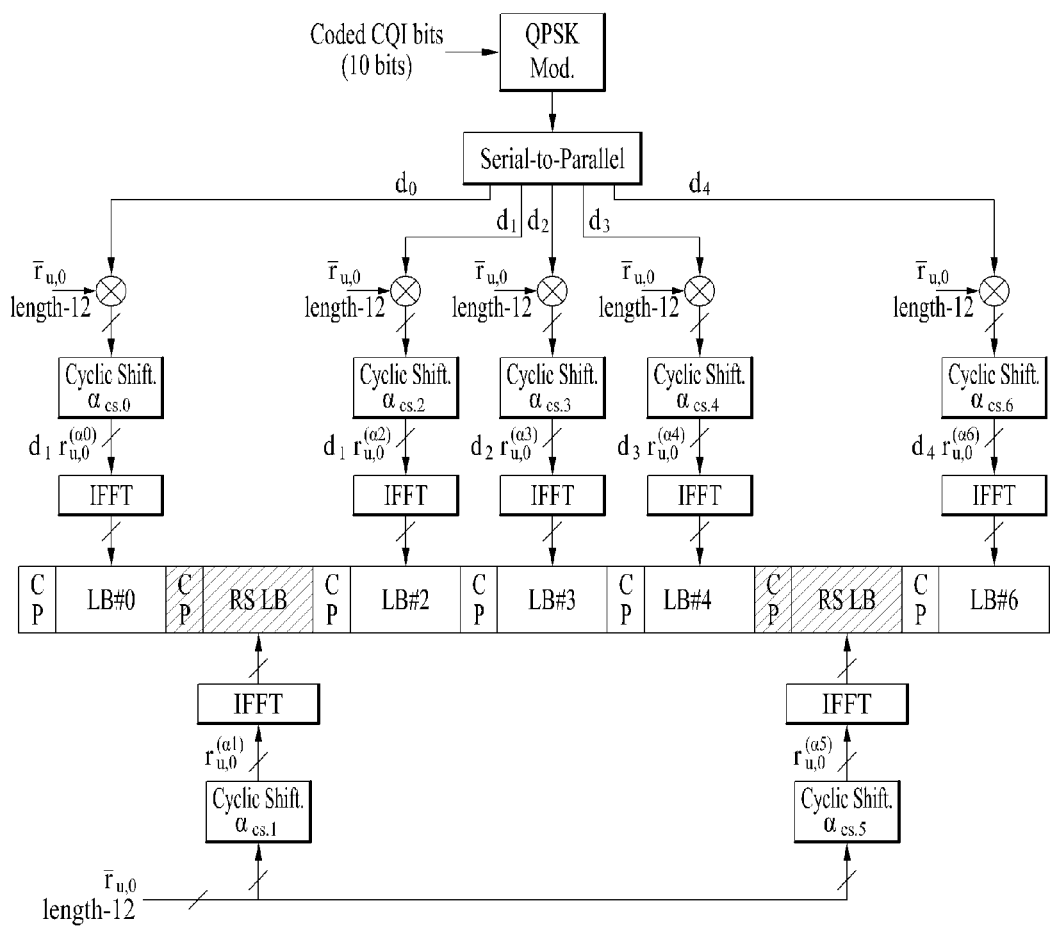
FIG. 5 illustrates a slot level structure of PUCCH format 2/2a/2b.

FIG. 5 illustrates a slot level structure of PUCCH formats 2/2a/2b. The PUCCH formats 2/2a/2b are used for CSI (e.g. CQI) transmission. In the case of normal CP, SC-FDMA symbols #1 and #5 in a slot are used for transmission of a demodulation reference signal (DM RS). In the case of extended CP, only SC-FDMA #3 in the slot is used for DM RS transmission.

Referring to FIG. 5, at a subframe level, 10-bit CSI is channel-coded into 20 coded bits using (20, k) Reed-Muller code punctured at a rate of 1/2 (not shown). The coded bits are scrambled (not shown) and then mapped to quadrature phase shift keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Parameters/resources for periodic CQI reports are configured semi-statically according to higher layer (e.g. radio resource control (RRC)) signaling. If a PUCCH resource index is set for CSI transmission, for example, CSI is periodically transmitted on a CSI PUCCH linked to the PUCCH resource index. The PUCCH resource index indicates a PUCCH RB and cyclic shift $\alpha_{cs}$.

Figure 6:
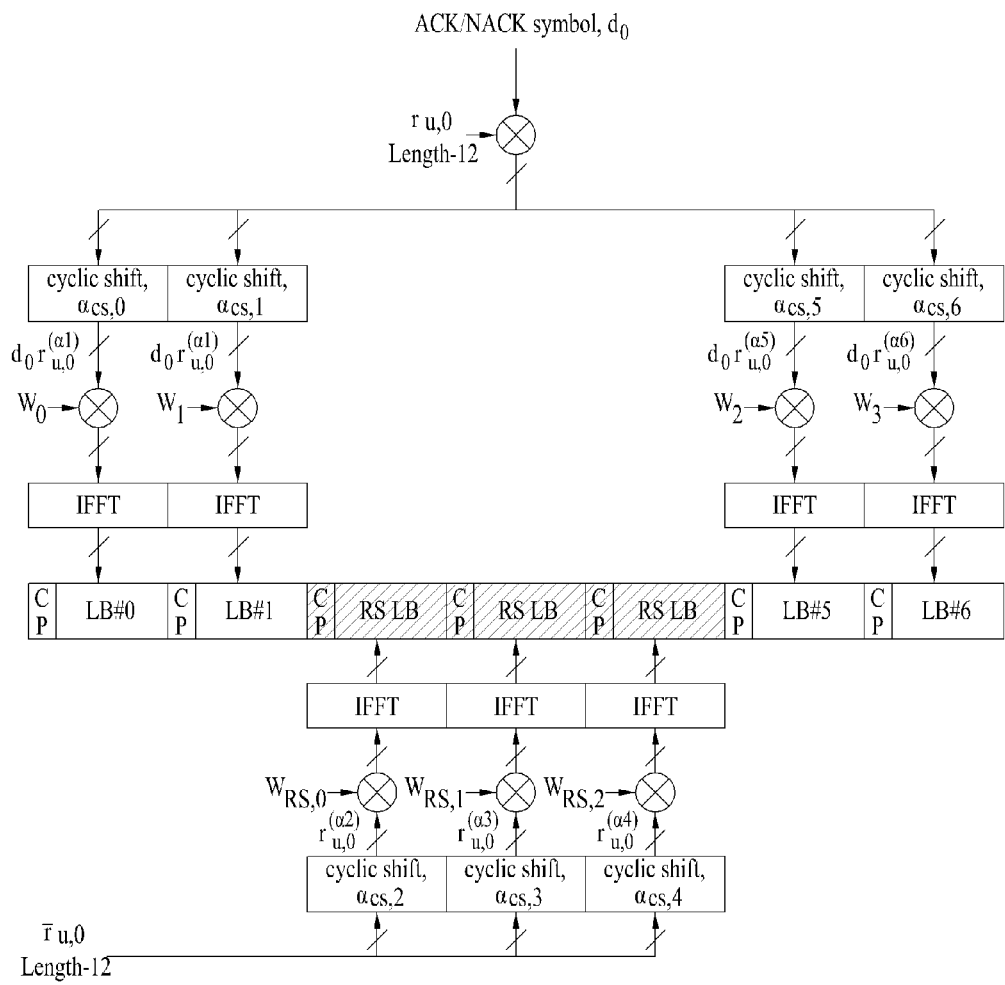
FIG. 6 illustrates a slot level structure of PUCCH format 1a/1b.

FIG. 6 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 6, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). The PUCCH formats 1a/1b perform cyclic shift $\alpha_{cs,x}$ in the frequency domain and carries out spreading using an orthogonal spreading code $W_0$, $W_1$, $W_2$, $W_3$, (e.g. Walsh-Hadamard or DFT code) in the time domain. A larger number of UEs can be multiplexed on the same PUCCH RB because code multiplexing is used in both frequency and time domains.

Figure 7:
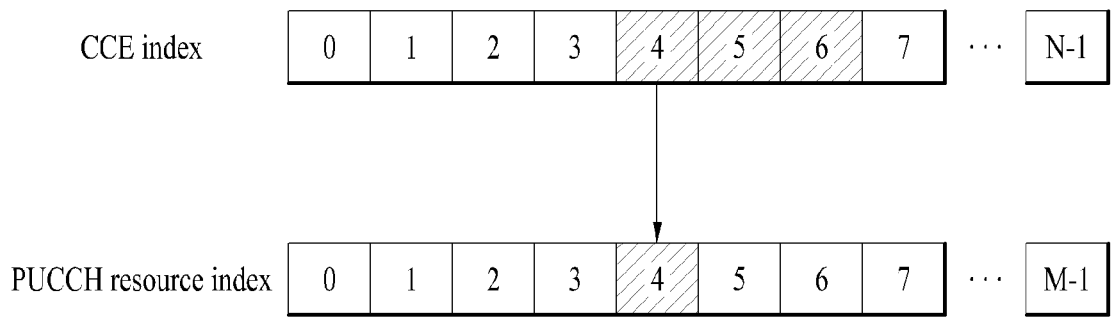
FIG. 7 illustrates an example of determining a PUCCH resource for ACK/NACK.

FIG. 7 illustrates an example of determining PUCCH resources for ACK/NACK. In LTE(-A), a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered or a PDCCH indicating SPS release. A PDCCH transmitted to the UE in each downlink subframe is composed of one or more control channel elements (CCEs). The UE transmits the ACK/NACK signal through a PUCCH resource corresponding to a specific one (e.g. first CCE) of the CCEs constituting the received PDCCH.

Referring to FIG. 7, each block in a downlink component carrier (DL CC) represents a CCE and each block in an uplink component carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 7, the UE transmits an ACK/NACK signal on PUCCH #4 corresponding to CCE #4, the first CCE of the PDCCH.

Specifically, a PUCCH resource index in LTE(-A) is determined as follows.

$$n^{(1)}_{PUCCH} = n_{CCE} + N^{(1)}_{PUCCH}$$ [Equation 1]

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a physical resource block (PRB) for PUCCH formats 1a/1b are obtained from $n^{(1)}_{PUCCH}$.

Since an LTE UE cannot simultaneously transmit a PUCCH and a PUSCH, UCI (e.g. CQI/PMI, HARQ-ACK, RI, etc.) is multiplexed in a PUSCH region (PUSCH piggybacking) when the UCI needs to be transmitted in a subframe through which a PUSCH is transmitted. In LTE(-A), a UE can be configured such that the UE cannot simultaneously transmit a PUCCH and a PUSCH. In this case, the UE can multiplex UCI (e.g. CQI/PMI, HARQ-ACK, RI, etc.) in a PUSCH region if the UCI needs to be transmitted in a subframe through which a PUSCH is transmitted.

Figure 8:
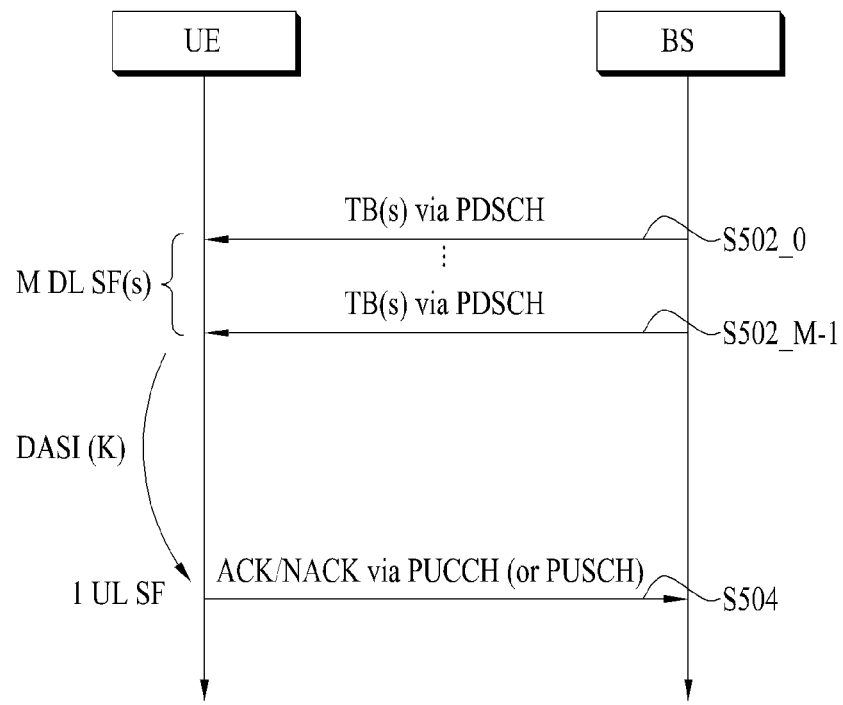
FIG. 8 illustrates a TDD UL ACK/NACK (uplink acknowledgement/negative acknowledgement) transmission procedure in a single cell situation.

FIG. 8 illustrates a TDD UL ACK/NACK transmission process in a single cell situation.

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically (refer to FIGS. 5 and 6), ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (downlink association set index).

Table 4 shows DASI (K: {k0, k1, . . . , $k_{M−1}$}) defined in LTE(-A). Table 4 shows spacing between a UL subframe transmitting ACK/NACK and a DL subframe relating to the UL subframe. Specifically, when a PDCCH indicating PDSCH transmission and/or (downlink) SPS release is present in a subframe n−k (k∈K), the UE transmits ACK/NACK in a subframe n.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit ACK/NACK signals for one or more DL signals (e.g. PDSCHs) received through M DL SFs, through a single UL SF. ACK/NACK signals for a plurality of DL SFs are transmitted through a single UL SF according to the following methods.

1) ACK/NACK bundling: ACK/NACK bits for a plurality of data units (e.g. PDSCH, SPS release PDCCH, etc.) are combined according to a logical AND operation. For example, upon successful decoding of all data units, an Rx node (e.g. UE) transmits ACK signals. If any of data units has not been decoded (detected), the Rx node does not transmit a NACK signal or no signal.

2) Channel selection: Upon reception of a plurality of data units (e.g. PDSCHs, SPS release PDCCHs, etc.), a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values). This is also referred to as ACK/NACK selection and PUCCH selection.

Figure 9:
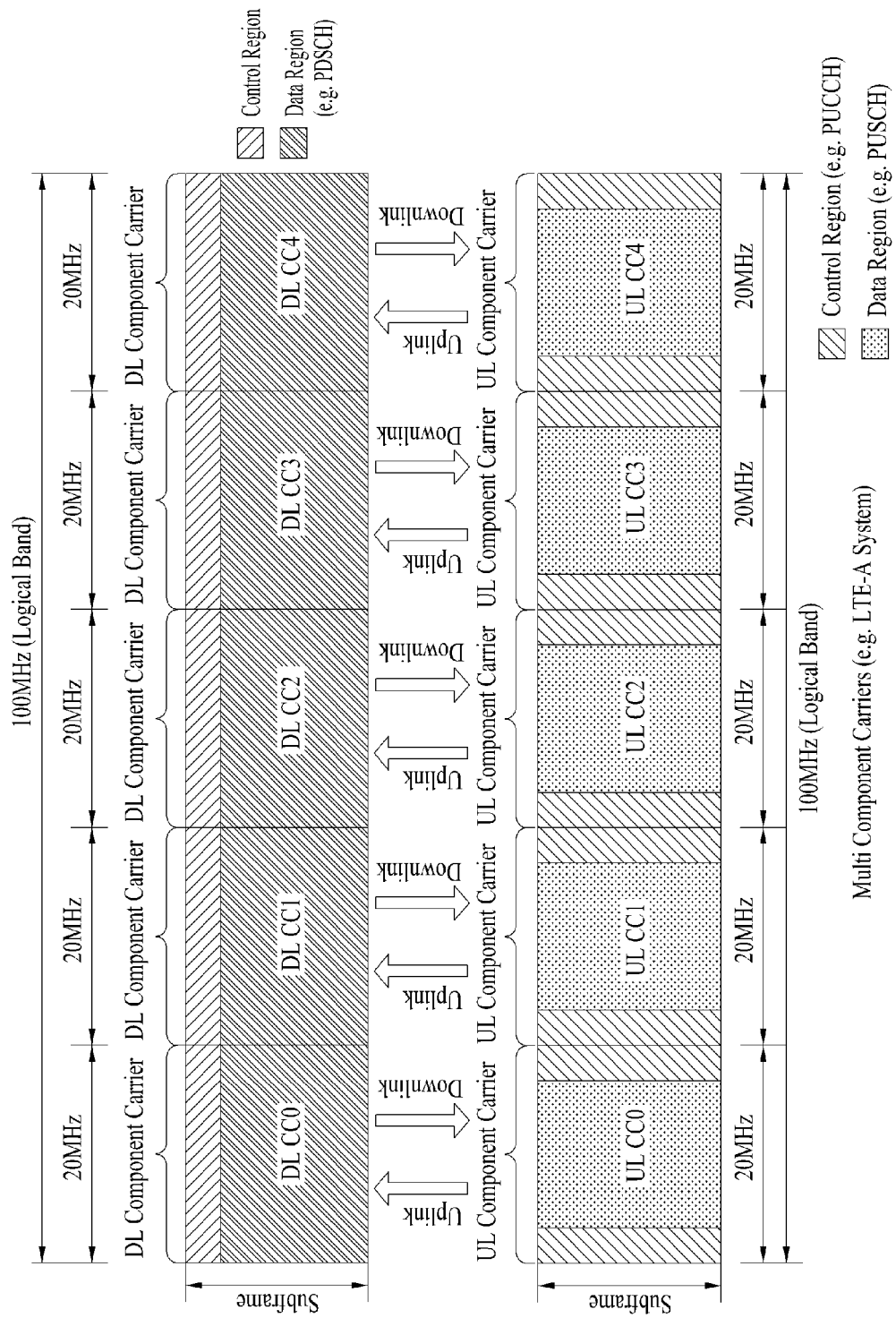
FIG. 9 illustrates a CA (carrier aggregation) communication system.

FIG. 9 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5 Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 10:
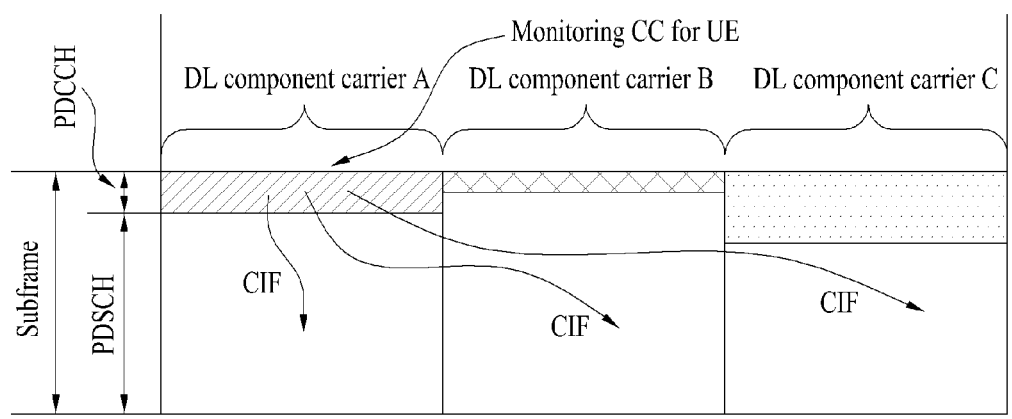
FIG. 10 illustrates cross-carrier scheduling.

FIG. 10 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

A beyond LTE-A system based on TDD may consider aggregation of a plurality of CCs in different UL-DL configurations. In this case, different A/N timings (i.e. UL SF timing at which A/N with respect to DL data transmitted through each DL SF is transmitted) may be set to a PCC and an SCC according to UL-DL configurations of the corresponding CCs. For example, UL SF timing at which A/N is transmitted for the same DL SF timing (DL data transmitted at the DL SF timing) can be set differently for the PCC and SCC, and a DL SF group for which A/N feedback is transmitted at the same UL SF timing can be set differently for the PCC and the SCC. Furthermore, link directions (i.e. DL or UL) of the PCC and the SCC may be set differently for the same SF timing. For example, the SCC can be set as UL SF at specific SF timing, whereas the PCC can be set as DL SF at the same SF timing.

In addition, the beyond LTE-A system based on TDD may support cross-CC scheduling in CA based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set to an MCC (monitoring CC) and an SCC. For example, a DL SF in which a UL grant/PHICH is transmitted can be set differently for the same UL SF. Furthermore, a UL SF group for which a UL grant or PHICH feedback is transmitted in the same DL SF can be set differently for the MCC and the SCC. In this case, link directions of the MCC and the SCC may be set differently for the same SF timing. For example, specific SF timing can be set to a DL SF in which a UL grant/PHICH will be transmitted in case of the SCC, whereas the SF timing can be set to a UL SF in case of the MCC.

When SF timing (referred to as collided SF hereinafter) at which link directions of the PCC and SCC are different from each other due to different TDD CA configurations is present, only a CC from the PCC and SCC, which has a specific link direction or has the same link direction as that of a specific CC (e.g. PCC), can be handled at the SF timing due to hardware configuration of the UE or for other reasons/purposes. This scheme is called HD (Half-Duplex)-TDD CA for convenience. For example, when SF collision occurs because specific SF timing is set to a DL SF in case of PCC and the SF timing is set to a UL SF in case of SCC, only a PCC (i.e. DL SF set to the PCC) corresponding to DL at the SF timing is handled and an SCC (i.e. UL SF set to the SCC) corresponding to UL is not handled at the SF timing (and vice versa). In this situation, to transmit A/N feedback for DL data, transmitted through DL SFs of all CCs, through a PCC, a method of applying A/N timing to each CC or commonly applying A/N timing set for a specific UL-DL configuration to all CCs can be considered. Here, a specific UL-DL configuration (referred to as a reference configuration (Ref-Cfg) hereinafter) commonly applied to all CCs (or a group of some CCs) can be identical to a UL-DL configuration set for the PCC or SCC or can be determined as a UL-DL configuration other than UL-DL configuration set for the PCC or SCC. For convenience, a CC corresponding to Ref-cfg is referred to as an XCC. The XCC may be a PCC, an SCC or other CCs.

In the case of HD-TDD CA, the number of DL SFs (referred to as A/D-DL SFs) to which A/N feedback will be delivered may be set differently for the PCC and SCC at a UL SF timing. In other words, when the number of DL SFs (A/N-DL SFs) corresponding to a single UL SF is defined as M, M can be set differently/independently for CCs for a single PCC UL SF (M per CC: Mc). When Ref-Cfg of an XCC does not correspond to a UL-DL configuration (i.e. PCC-Cfg) of a PCC, an A/N-DL SF index of the XCC, set at PCC UL SF timing, may differ from an A/N-DL SF index when A/N timing of PCC-Cfg is applied. Particularly, when a PUCCH resource linked to a CCE resource of a PDCCH that schedules DL data is referred to as an implicit PUCCH, an implicit PUCCH may not be defined (in a PCC UL SF in which A/N for a specific XCC DL SF will be transmitted) for the specific XCC DL SF (PDCCH that schedules DL data to be transmitted through the specific XCC DL SF) even in a cross-CC scheduling situation.

Figure 11:
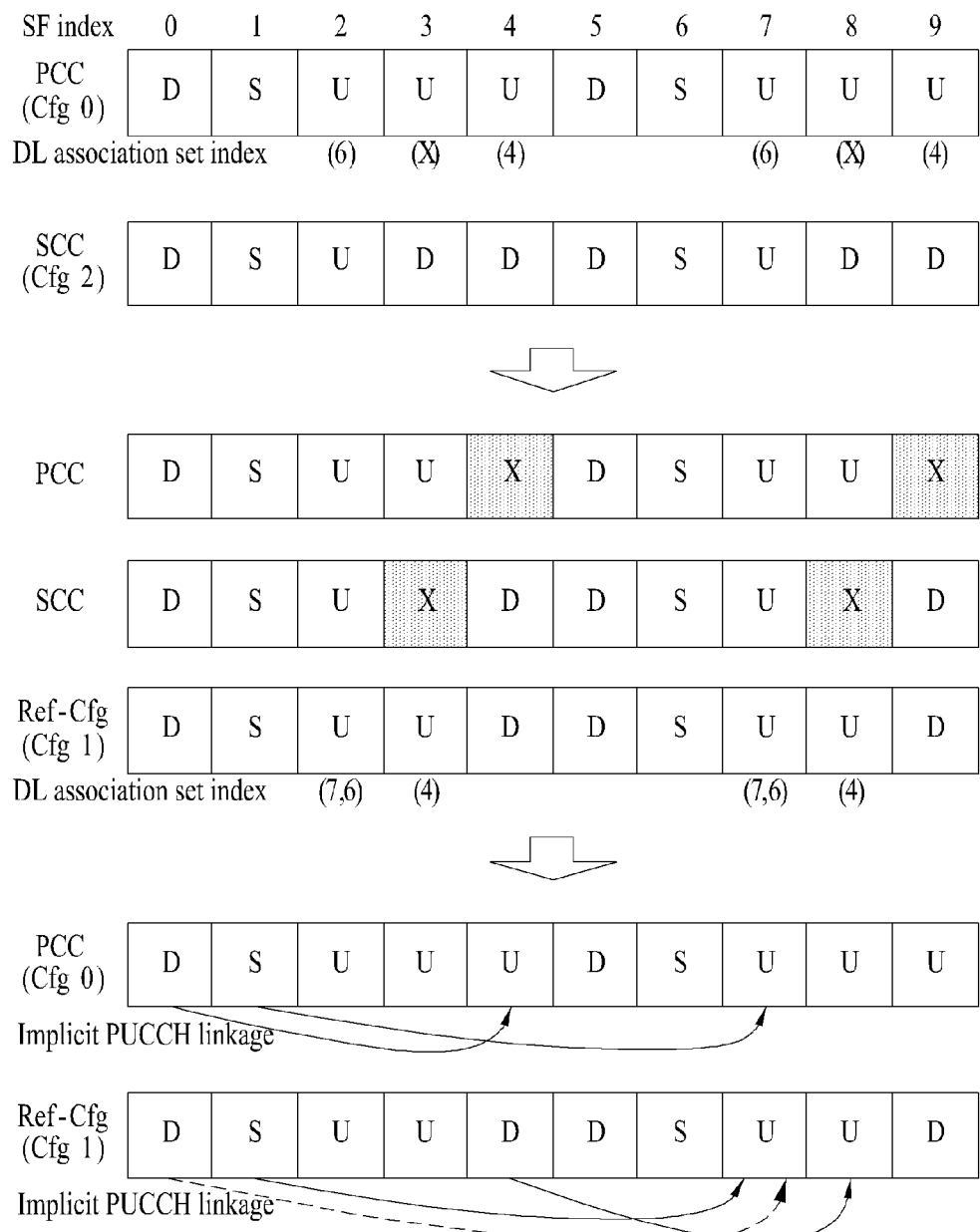
FIG. 11 illustrates HD (half duplex)-TDD CA.

FIG. 11 illustrates an HD-TDD CA structure. In FIG. 11, shaded portion X denotes a CC (link direction), use of which is prohibited in a collided SF, and a dotted arrow represents a DL SF corresponding to a PCC UL SF to which an implicit PUCCH is not linked.

Figure 12:
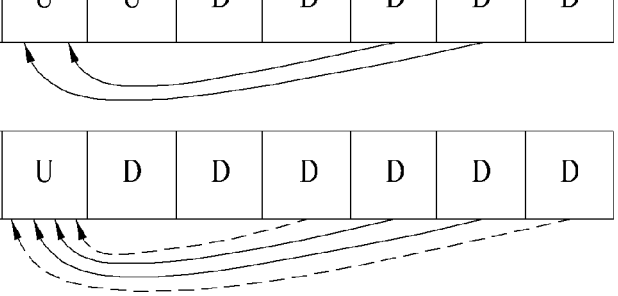
FIG. 12 illustrates FD (full duplex)-TDD CA.

A scheme of permitting simultaneous DL/UL transmission and reception in a collided SF in which link directions of a PCC and an SCC are different from each other can be considered. This scheme is referred to as FDD (full duplex)-TDD CA for convenience. Even in this case, A/N timing can be applied per CC or A/N timing of Ref-Cfg can be commonly applied to all CCs in order to transmit A/N feedback for DL SFs of all CCs through a single PCC UL SF. Ref-Cfg can correspond to PCC Cfg or SCC-Cfg or can be determined as a UL-DL configuration other than PCC Cfg or SCC-Cfg. In FD-TDD CA, M can be set differently/independently for CCs for a single PCC UL SF and an implicit PUCCH resource may not be defined (in a PCC UL SF corresponding to an XCC DL SF) for the XCC DL SF even in a cross-CC scheduling situation. FIG. 12 illustrates an FD-TDD CA structure. In FIG. 12, a dotted arrow represents a DL SF corresponding to a PCC UL SF to which an implicit PUCCH resource is not linked.

As described above, the number of DL subframes corresponding to a UL subframe (referred to as an A/N subframe) in which A/N is transmitted can vary between CCs (or cells) due to introduction of various TDD CA situations (e.g. aggregation of CCs having different UL-DL configurations, HD-TDD CA, FD-TDD CA, etc.) and/or definition of Ref-Cfg according thereto. A description will be given of a method for efficiently transmitting A/N information when CCs (or cells) having different UL-DL configurations are aggregated based on A/N transmission mode (e.g. channel selection mode or PUCCH format 3 mode).

Embodiment 1: A/N Resources for Channel Selection

A method for transmitting A/N when a channel selection mode is set in TDD CA of LTE-A will now be described. In LTE-A, channel selection is applicable to a case in which 2 CCs (i.e. a PCC and an SCC) having the same DL-UL configuration for A/N transmission. The channel selection mode can refer to channel selection using PUCCH format 1b.

Specifically, when M≤2 in a UL subframe n for HARQ-ACK transmission, a UE can transmit b(0)b(1) on a PUCCH resource selected from A PUCCH resources $n^{(1)}_{PUCCH,i}$ (0≤i≤A−1 and A ⊂ {2, 3, 4}). Specifically, the UE transmits an A/N signal using PUCCH format 1b in the UL subframe n according to Tables 5, 6 and 7. When M=1 in the UL subframe n, HARQ-ACK(j) represents an A/N response to a transport block (TB) or SPS release PDCCH related to a serving cell c. Here, when M=1, the TB, HARQ-ACK(j) and A PUCCH resources can be provided according to Table 8. When M=2 in the UL subframe n, HARQ-ACK(j) represents an A/N response to a TB or SPS release PDCCH in DL subframe(s) given by a set K in each serving cell. Here, when M=2, subframes and A PUCCH resources on each serving cell for HARQ-ACK(j) can be provided according to Table 9.

Table 5 is a mapping table for channel selection, which is defined in LTE-A when 2 CCs having the same UL-DL configuration are aggregated, M=1 and A=2.

TABLE 5

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

Table 6 is a mapping table for channel selection, which is defined in LTE-A when 2 CCs having the same UL-DL configuration are aggregated, M=1 and A=3.

TABLE 6

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

Table 7 is a mapping table for channel selection, which is defined in LTE-A when 2 CCs having the same UL-DL configuration are aggregated, M≤2 and A=4.

TABLE 7

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |

TABLE 7-continued

| HARQ-ACK(0), HARQ-ACK(1), HARQ-ACK(2), HARQ-ACK(3) | $n_{PUCCH}^{(1)}$ | b(0)b(1) |
|---|---|---|
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Table 8 shows a TB, HARQ-ACK(j) and PUCCH resource when M=1.

TABLE 8

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB2 Secondary cell | NA | NA |
| 3 | TB1 Serving cell1 | TB2 Serving cell1 | TB3 Serving cell2 | NA |
| 4 | TB1 Primary cell | TB2 Primary cell | TB3 Secondary cell | TB4 Secondary cell |

\* TB: transport block, NA: not available

Table 9 shows a TB, HARQ-ACK(j) and PUCCH resource when M=2.

TABLE 9

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A case in which M>2 in the UL subframe n for HARQ-ACK transmission is identical/similar to a case in which M≤2. Specifically, the UE transmits an A/N signal in the UL subframe using PUCCH format 1b according to Tables 10 and 11. When M>2 in the UL subframe n, $n_{PUCCH,0}^{(1)}$ and $n_{PUCCH,1}^{(1)}$ are associated with DL transmission (e.g. PDCCH transmission) on a PCell and $n_{PUCCH,2}^{(1)}$ and $n_{PUCCH,3}^{(1)}$ are associated with DL transmission (e.g. PDSCH transmission) on an SCell.

Table 10 is a mapping table for channel section, defined in LTE-A, when 2 CCs having the same UL-DL configuration are aggregated and M=3.

TABLE 10

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Table 11 is a mapping table for channel section, defined in LTE-A, when 2 CCs having the same UL-DL configuration are aggregated and M=4.

TABLE 11

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |

TABLE 11-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |

TABLE 11-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| DTX, any, any, any | (ACK, NACK/DTX, any, any), except for (ACK, DTX, DTX, DTX) | No Transmission | | 0, 0, 0, 0 |

Figure 13:
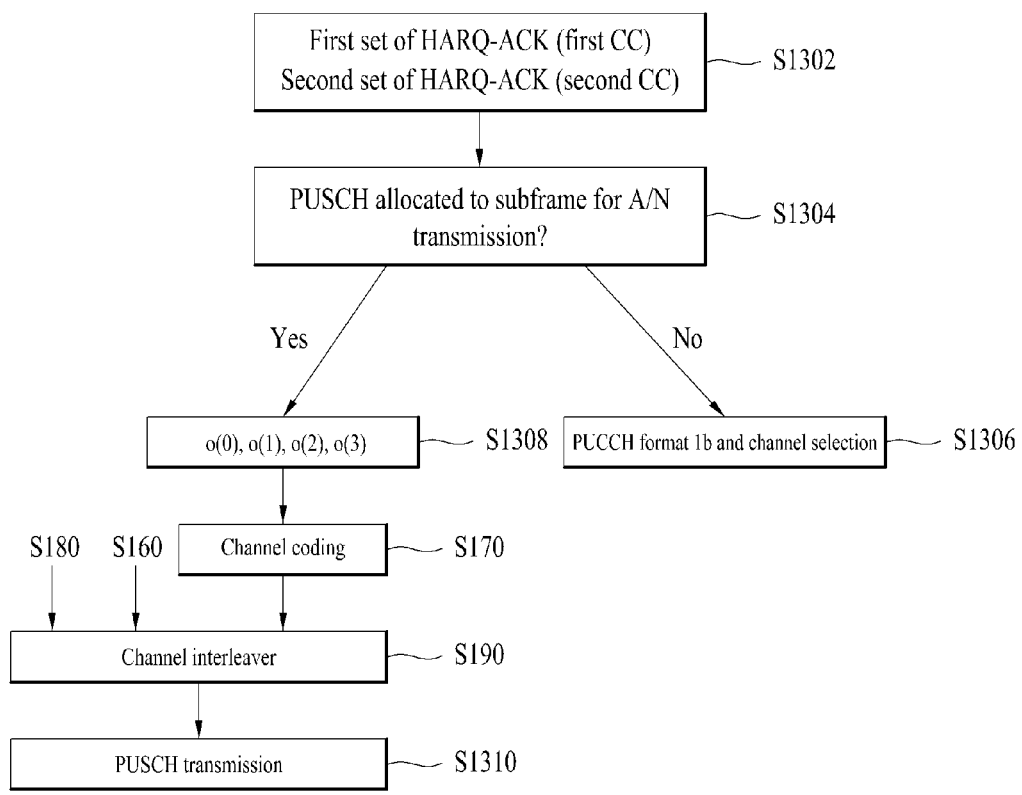
FIG. 13 illustrates a channel selection based A/N transmission procedure in TDD CA.

FIG. 13 illustrates a channel selection based A/N transmission procedure in TDD CA. When the channel selection mode is set, TDD CA assumes a case in which 2 CCs (e.g. a PCC and an SCC) having the same UL-DL configuration are aggregated.

Referring to FIG. 13, the UE generates a first set of HARQ-ACK for a first CC (or cell) and a second set of HARQ-ACK for a second CC (or cell) (S1302). Then, the UE checks whether a PUSCH is allocated to a subframe (referred to as an A/N subframe hereinafter) for A/N transmission (S1304). When no PUSCH is allocated to the A/N subframe, the UE transmits A/N information using PUCCH format 1b and channel selection (refer to Tables 5 to 11). On the contrary, when a PUSCH is allocated to the A/N subframe, the UE multiplexes A/N bits in the PUSCH. Specifically, the UE generates an A/N bit sequence (e.g. o(0), o(1), o(2), o(3) of Tables 10 and 11) corresponding to the first HARQ-ACK set and the second HARQ-ACK set (S1308). The A/N bit sequence passes through channel coding (S170) and channel interleaving (S190) and then is transmitted through the PUSCH. Channel coding includes Reed-Muller (RM) coding, Tail-biting convolutional coding, etc.

LTE-A considers the following PUCCH resource allocation method for M=1, 2, 3, 4 according to whether or not cross-CC scheduling is applied when CCs having the same UL-DL configuration are aggregated. Here, an explicit PUCCH refers to an A/N resource allocated through RRC and LTE-A uses a TPC field in a PDCCH that schedules SCCs in a non-cross-CC scheduling state for an ARI (ACK/NACK resource indicator) for indicating one of a plurality of explicit PUCCH sets.

■ Cross-CC scheduling

M=1:
  One or two implicit PUCCH resources (here, the number of resources corresponds to a maximum number of TBs that can be transmitted through a PCC) linked to a PDCCH that schedules the PCC
  One or two implicit PUCCH resources (here, the number of resources corresponds to a maximum number of TBs that can be transmitted through an SCC) linked to a PDCCH that schedules the SCC M=2:
  One implicit PUCCH resource linked to a PDCCH that schedules the first DL SF of the PCC and one implicit PUCCH resource linked to a PDCCH that schedules the second DL SF of the PCC
  One implicit PUCCH resource linked to a PDCCH that schedules the first DL SF of the SCC and one implicit PUCCH resource linked to a PDCCH that schedules the second DL SF of the SCC M=3:
  One implicit PUCCH resource linked to a PDCCH that schedules the PCC and corresponds to DAI=1 and one implicit PUCCH resource linked to a PDCCH that schedules the PCC and corresponds to DAI=2
  One implicit PUCCH resource linked to a PDCCH that schedules the SCC and corresponds to DAI=1 and one implicit PUCCH resource linked to a PDCCH that schedules the SCC and corresponds to DAI=2

M=4: identical to the case of M=3

■ Non-cross-CC scheduling

M=1:
  One or two implicit PUCCH resources (here, the number of resources corresponds to a maximum number of TBs that can be transmitted through the PCC) linked to the PDCCH that schedules the PCC
  One or two explicit PUCCH resources (here, the number of resources corresponds to a maximum number of TBs that can be transmitted through the SCC) allocated through RRC and determined by an ARI M=2:
  One implicit PUCCH resource linked to the PDCCH that schedules the first DL SF of the PCC and one implicit PUCCH resource linked to the PDCCH that schedules the second DL SF of the PCC
  Two explicit PUCCH resources allocated through RRC and determined by an ARI M=3:
  One implicit PUCCH resource linked to the PDCCH that schedules the PCC and corresponds to DAI=1 and one implicit PUCCH resource linked to the PDCCH that schedules the PCC and corresponds to DAI=2
  Two explicit PUCCH resources allocated through RRC and determined by an ARI M=4: identical to the case of M=3

A description will be given of a PUCCH resource allocation method for channel selection based A/N transmission when plural CCs having different TDD DL-UL configurations are aggregated. The number of A/N-DL SFs of an XCC and an R-SF index of an A/N-DL SF of the XCC, which are set at specific PCC UL SF timing based on Ref-Cfg, are respectively defined as M and R-SF indices. In addition, when A/N timing of PCC-Cfg is applied, an A/N-DL SF index set at corresponding PCC UL SF timing is defined as an O-SF index. The XCC may be a PCC or an SCC when cross-CC scheduling is applied and may be a PCC when non-cross-CC scheduling is applied. When the XCC corresponds to the SCC, the R-SF index can be defined as a PCC DL SF index corresponding to a PCC DL SF in which a PDCCH, which schedules DL data to be transmitted through an SCC A/N-DL SF set at specific PCC UL SF timing based on Ref-Cfg, is transmitted. For example, on the assumption that cross-CC scheduling is used in FIGS. 11 and 12, a PDCCH that schedules DL data to be transmitted through DL SF #4 of the SCC can be transmitted in PCC DL SF #1, and DL SF timing at which the DL data is transmitted through the SCC can be set differently from DL SF timing at which the DL data scheduling PDCCH is transmitted (through the PCC) under similar conditions. A PCC DL SF index corresponding to a PCC DL SF in which a PDCCH, which schedules DL data to be transmitted through SCC SF #n in cross-CC scheduling situation, is transmitted can be set as a DL SF index closest to and prior to the SCC DL SF #n including the SCC DL SF #n.

The number of R-SF indices identical to the O-SF index is defined as Ns and the number of R-SF indices that are not identical to the O-SF index is defined as Nd. Accordingly, M=Ns+Nd. Here, implicit PUCCHs are defined in PCC UL SFs (corresponding to Ns XCC DL SF indices) for the Ns XCC DL SF indices, whereas implicit PUCCHs are not defined in PCC UL SFs (corresponding to Nd XCC DL SF indices) for the Nd XCC DL SF indices. Accordingly, in the present embodiment, an implicit PUCCH resource (linked to a PDCCH that schedules an XCC DL SF corresponding to the same R-SF index as the O-SF index) is reserved for the XCC DL SF and an explicit PUCCH resource is reserved (through RRC signaling) for an XCC DL SF corresponding to an R-SF index different from the O-SF index according to the basic rule of PUCCH resource allocation. PUCCH resources considered/used for channel selection, from among PUCCH resources reserved according to the proposed rule, can be limited to resources linked/corresponding to SFs scheduled by PDCCHs having specific DAI values (e.g. 1 and/or 2).

Figure 14:
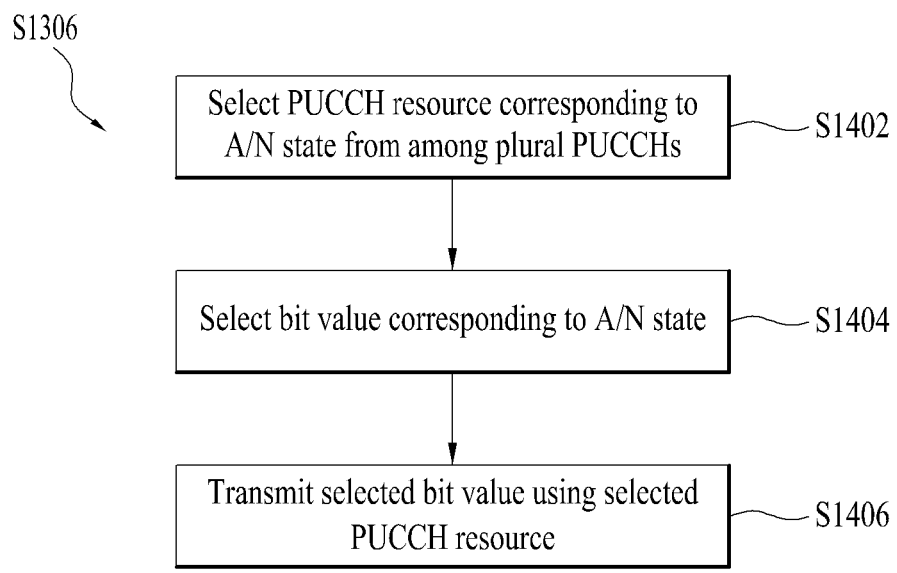
FIG. 14 illustrates an A/N transmission procedure according to an embodiment of the present invention.

FIG. 14 illustrates an A/N transmission procedure according to the method proposed above. FIG. 14 corresponds to PUCCH format 1b and channel selection process (S1306) in FIG. 13. Referring to FIG. 14, the UE selects a PUCCH resource corresponding to an A/N state from a plurality of PUCCH resources (S1402) and selects a bit value corresponding to the A/N state (S1404). The channel selection process can refer to Tables 5 to 11. The UE transmits the selected bit value using the selected PUCCH resource (S1406). In this case, an implicit PUCCH resource can be reserved for an XCC DL SF corresponding to an R-SF index identical to the O-SF index and an explicit PUCCH resource can be reserved for an XCC DL SF corresponding to an R-SF index different from the O-SF index for the plurality of PUCCH resources for channel selection.

Specifically, a method for determining an available implicit PUCCH resource and an explicit PUCCH resource that needs to be additionally allocated in consideration of M, Ns and Nd is proposed as follows.

■ M=1
  When Ns=1 and Nd=0
    One or two implicit PUCCH resources (here, the number of resources can be equal to a maximum number of TBs that can be transmitted through an XCC or be fixed to 1 according to spatial bundling) linked to a PDCCH that schedules the XCC
  When Ns=0 and Nd=1
    One or two explicit PUCCH resources (here, the number of resources can be equal to a maximum number of TBs that can be transmitted through the XCC or be fixed to 1 according to spatial bundling) pre-allocated by RRC and then determined by an ARI
■ M=2
  When Ns=2 and Nd=0
    One implicit PUCCH resource linked to a PDCCH that schedules the first DL SF of the XCC
    One implicit PUCCH resource linked to a PDCCH that schedules the second DL SF of the XCC
  When Ns=1 and Nd=1
    One implicit PUCCH resource linked to a PDCCH that schedules an XCC DL SF corresponding to the O-SF index
    One explicit PUCCH resource pre-allocated by RRC and then determined by an ARI (here, the resource can be set to a resource linked to an XCC DL SF that does not correspond to the O-SF index)
  When Ns=0 and Nd=2
    Two explicit PUCCH resources pre-allocated by RRC and then determined by an ARI
■ M=3
  When Ns=3 and Nd=0
    One implicit PUCCH resource linked to a PDCCH that schedules the XCC and corresponds to DAI=1
    One implicit PUCCH resource linked to a PDCCH that schedules the XCC and corresponds to DAI=2
  When Ns=2 and Nd=1
    One implicit PUCCH resource linked to a PDCCH that schedules each XCC DL SF corresponding to the O-SF index (the total number of resources linked to 2 XCC DL SFs is 2 since Ns=2)
    One explicit PUCCH resource pre-allocated by RRC and then determined by an ARI (the resource can be set to a resource linked to an XCC DL SF that does not correspond to the O-SF index)
    Here, two resources linked to SFs corresponding to DAI=1 and 2 from among the above-described three resources can be allocated as resources used for channel selection.
  When Ns=1 and Nd=2
    One implicit PUCCH resource linked to a PDCCH that schedules an XCC DL SF corresponding to the O-SF index
    Two explicit PUCCH resources pre-allocated by RRC and then determined by an ARI (the resources can be set to resources linked to SFs respectively corresponding to DAI=1 and 2 from among two XCC DL SFs that do not correspond to the O-SF index)
    Here, two resources linked to SFs corresponding to DAI=1 and 2 from among the above-described three resources can be allocated as resources for channel selection.
  When Ns=0 and Nd=3
    Two explicit PUCCH resources pre-allocated by RRC and then determined by an ARI
■ M=4
  When Ns=4 and Nd=0
    One implicit PUCCH resource linked to a PDCCH that schedules the XCC and corresponds to DAI=1
    One implicit PUCCH resource linked to a PDCCH that schedules the XCC and corresponds to DAI=2
  When Ns=3 and Nd=1
    One implicit PUCCH resource linked to a PDCCH that schedules each XCC DL SF corresponding to the O-SF index (the total number of resources linked to 3 XCC DL SFs is 3 since Ns=3)
    One explicit PUCCH resource pre-allocated by RRC and then determined by an ARI (the resource can be set to a resource linked to an XCC DL SF that does not correspond to the O-SF index)
    Here, two resources linked to SFs corresponding to DAI=1 and 2 from among four resources can be allocated as resources used for channel selection.

When Ns=2 and Nd=2
  One implicit PUCCH resource linked to a PDCCH that schedules an XCC DL SF corresponding to the O-SF index (the total number of resources linked to 2 XCC DL SFs is 2 since Ns=2)
  Two explicit PUCCH resources pre-allocated by RRC and then determined by an ARI (the resources can be set to resources linked to SFs respectively corresponding to DAI=1 and 2 from among two XCC DL SFs that do not correspond to the O-SF index)
  Here, two resources linked to SFs corresponding to DAI=1 and 2 from among the four resources can be allocated as resources for channel selection.
When Ns=1 and Nd=3
  One implicit PUCCH resource linked to a PDCCH that schedules an XCC DL SF corresponding to the O-SF index
  Two explicit PUCCH resources pre-allocated by RRC and then determined by an ARI (the resources can be set to resources linked to SFs respectively corresponding to DAI=1 and 2 from among three XCC DL SFs that do not correspond to the O-SF index)
  Here, two resources linked to SFs corresponding to DAI=1 and 2 from among the four resources can be allocated as resources for channel selection.
When Ns=0 and Nd=4
  Two explicit PUCCH resources pre-allocated by RRC and then determined by an ARI Here, when the XCC corresponds to a PCC, the following two resource allocation schemes can be considered for operation of explicit PUCCHs allocated to the PCC.

■ Alt 1-1: a plurality of explicit PUCCH sets is allocated through RRC and channel selection is applied using one of the PUCCH sets, which is indicated by an ARI. Here, the ARI can be signaled using TPC fields in some or all PDCCHs that schedule PCCs.

■ Alt 1-2: Only one (instead of a plurality of) explicit PUCCH set is allocated through RRC and channel selection is applied using only the corresponding set without reference to an ARI. Here, TPC fields in PDCCHs that schedule PCCs are used for power control.

When the XCC corresponds to an SCC, resource allocation schemes according to the following methods 1-1 and 1-2 can be additionally considered. For reference, implicit PUCCH resources (linked to PDCCHs that schedule all XCC DL SFs corresponding to an R-SF index) are reserved for the XCC DL SFs when the R-SF index corresponds to the O-SF index and explicit PUCCH resources are reserved (through RRC signaling) for all XCC DL SFs corresponding to one or more R-SF indices when the R-SF indices are different from the O-SF index according to the fundamental rule of method 1-1. In addition, when an explicit PUCCH is allocated to the SCC according to the proposed scheme, a TPC field in a PDCCH that schedules the SCC can be used for an ARI even when cross-CC scheduling is used.

[Method 1-1]
■ M=1
When Nd=0
  One or two implicit PUCCH resources linked to a PDCCH that schedules the XCC (the number of resources can be equal to a maximum number of TBs that can be transmitted through the XCC or be fixed to 1 according to spatial bundling)
When Nd>0
  One or two explicit PUCCH resources pre-allocated through RRC and then determined by an ARI (the number of resources can be equal to a maximum number of TBs that can be transmitted through the XCC or be fixed to 1 according to spatial bundling)
■ M=2
When Nd=0
  One implicit PUCCH resource linked to a PDCCH that schedules the first DL SF of the XCC
  One implicit PUCCH resource linked to a PDCCH that schedules the second DL SF of the XCC
When Nd>0
  Two explicit PUCCH resources pre-allocated through RRC and then determined by an ARI
■ M=3, 4
When Nd=0
  One implicit PUCCH resource linked to a PDCCH that schedules the XCC and corresponds to DAI=1
  One implicit PUCCH resource linked to a PDCCH that schedules the XCC and corresponds to DAI=2
When Nd>0
  Two explicit PUCCH resources pre-allocated through RRC and then determined by an ARI

[Method 1-2]
■ M=1
Applied irrespective of Nd
  One or two explicit PUCCH resources pre-allocated through RRC and then determined by an ARI (the number of resources can be equal to a maximum number of TBs that can be transmitted through the XCC or be fixed to 1 according to spatial bundling)
■ M=2, 3, 4
Applied irrespective of Nd
  Two explicit PUCCH resources pre-allocated through RRC and then determined by an ARI When the XCC corresponds to an SCC (in a cross-CC scheduling situation), resource allocation schemes according to the following methods 1-3 and 1-4 can be additionally considered. For reference, according to the fundamental rule of method 1-3, implicit PUCCH resources (linked to PDCCHs that schedule all XCC DL SFs corresponding to an R-SF index) are reserved for the XCC DL SFs when Ref-Cfg of the XCC is set to PCC-Cfg and explicit PUCCH resources are reserved (through RRC signaling) for all XCC DL SFs corresponding to the R-SF index when Ref-Cfg of the XCC is set to DL-UL Cfg rather than PCC-Cfg. When an explicit PUCCH is allocated to the SCC according to a scheme proposed in the specification, a TPC field in a PDCCH that schedules the SCC can be used for an ARI even when cross-CC scheduling is used.

[Method 1-3]
■ M=1
When Ref-Cfg of the XCC is set to PCC-Cfg
  One or two implicit PUCCH resources linked to a PDCCH that schedules the XCC (the number of resources can be equal to a maximum number of TBs that can be transmitted through the XCC or be fixed to 1 according to spatial bundling)
When Ref-Cfg of the XCC is set to DL-UL Cfg rather than PCC-Cfg
  One or two explicit PUCCH resources pre-allocated through RRC and then determined by an ARI (the number of resources can be equal to a maximum number of TBs that can be transmitted through the XCC or be fixed to 1 according to spatial bundling)
■ M=2
When Ref-Cfg of the XCC is set to PCC-Cfg
  One implicit PUCCH resource linked to a PDCCH that schedules the first DL SF of the XCC One implicit PUCCH resource linked to a PDCCH that schedules the second DL SF of the XCC When Ref-Cfg of the XCC is set to DL-UL Cfg rather than PCC-Cfg Two explicit PUCCH resources pre-allocated through RRC and then determined by an ARI

■ M=3, 4

When Ref-Cfg of the XCC is set to PCC-Cfg

One implicit PUCCH resource linked to a PDCCH that schedules the XCC and corresponds to DAI=1

One implicit PUCCH resource linked to a PDCCH that schedules the XCC and corresponds to DAI=2

When Ref-Cfg of the XCC is set to DL-UL Cfg rather than PCC-Cfg

Two explicit PUCCH resources pre-allocated through RRC and then determined by an ARI

[Method 1-4]

■ M=1

Applied irrespective of Ref-Cfg of the XCC

One or two explicit PUCCH resources pre-allocated through RRC and then determined by an ARI (the number of resources can be equal to a maximum number of TBs that can be transmitted through the XCC or be fixed to 1 according to spatial bundling)

■ M=2, 3, 4

Applied irrespective of Ref-Cfg of the XCC

Two explicit PUCCH resources pre-allocated through RRC and then determined by an ARI A special SF (S SF) (corresponding to S SF configuration #0 in Table 2, for example) including a DwPTS period composed of N (e.g. 3) or fewer OFDM symbols can be allocated. In this case, when the S SF is set to a PCC (i.e. PCell), a PDCCH (that requires only 1-bit A/N feedback) that indicates SPS release can be transmitted through the S SF. On the contrary, when the S SF is set to an SCC (i.e. SCell), PDCCH/DL data that requires A/N feedback cannot be transmitted through the S SF. Accordingly, when the S SF (referred to as a shortest S SF) having a short DwPTS period is set to a PCell in application of the proposed method, A/N corresponding to the shortest S SF can be allocated 1 bit at all times irrespective of a value Ntb set to the PCell or the shortest S SF can be excluded from A/N-DL SFs for determining M. In this case, the UE can consider that the PDCCH indicating SPS release is not transmitted through the shortest S SF (and thus a PDCCH monitoring process (e.g. blind decoding) can be omitted in the PCell S SF). When the shortest S SF is set to an SCell, the shortest S SF can be excluded from the A/N-DL SFs for determining M. In addition, when the PCell and SCell have the same TDD DL-UL configuration, the proposed methods are applicable based on the above-described scheme (of allocating 1 bit to A/N corresponding to the shortest S SF at all times or excluding the shortest S SF from the A/N-DL SFs (for determining M)) if the shortest S SF is set to the PCell and SCell.

Embodiment 2: Simultaneous Transmission of Channel Selection Based A/N and Periodic CSI In LTE-A TDD, when A/N transmission timing and periodic CSI transmission timing correspond to the same UL SF while an A/N transmission mode is set to the channel selection mode, the A/N and CSI are simultaneously transmitted using PUCCH format 2/2a/2b if the A/N satisfies a specific condition and transmission of the CSI is dropped and, otherwise, only the A/N is transmitted through channel selection. The specific condition includes a case in which the A/N is composed of only A/N for DL data received through a PCell. That is, the specific condition includes a case in which only DL data transmitted on a PCell through an A/N-DL SF corresponding to the UL SF is received.

When plural cells having different UL-DL configurations are aggregated, M for the PCell may be 0. In this case, according to a conventional method (of determining whether or not to simultaneously transmit A/N and CSI according to whether only A/N for the PCell is present or not), the CSI is unconditionally dropped since DL data cannot be received through the PCell. Accordingly, when M with respect to the PCell is 0, the target of the specific condition for determining whether to simultaneously transmit A/N and CSI can be changed to A/N for all cells (PCell and SCell), that is, A/N for the SCell (since A/N corresponding to the PCell) is not present) in order to reduce CSI drop and increase CSI transmission opportunity. Therefore, when A/N transmission timing and CSI transmission timing correspond to the same UL SF in the channel selection mode and M with respect to the PCell corresponding to the UL SF is 0, A/N and CSI are simultaneously transmitted using PUCCH format 2/2a/2b (without checking whether the specific condition is satisfied and dropping the CSI). Here, a TPC field in a PDCCH that schedules an A/N-DL SF of the SCell, which corresponds to the UL SF, can be used for power control (instead of ARI signaling).

The above-described method can be limited to operations in a situation in which simultaneous transmission of A/N and CSI is permitted through higher layer (e.g. RRC) signaling.

Figure 15:
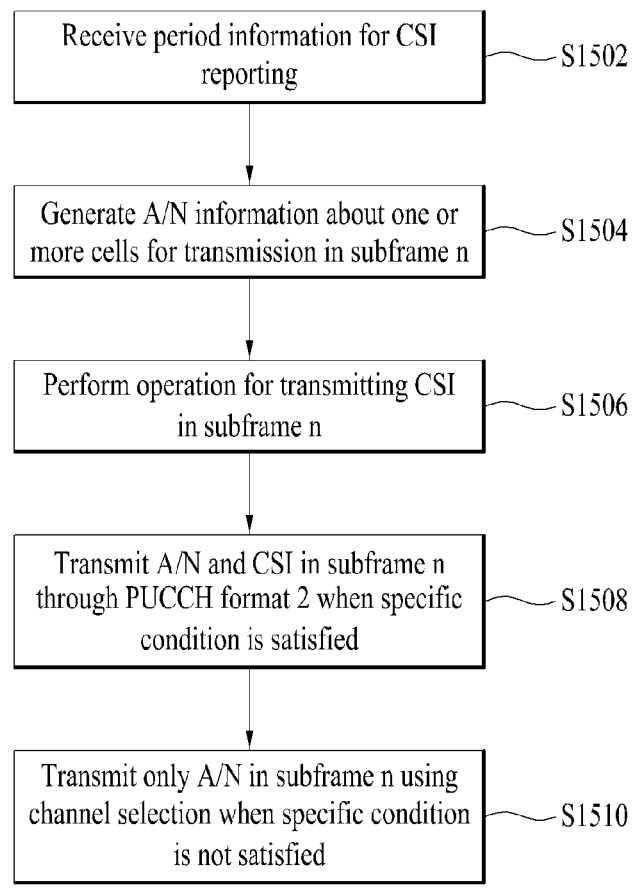
FIG. 15 illustrates an A/N transmission procedure according to another embodiment of the present invention.

FIG. 15 illustrates a procedure of transmitting A/N and CSI according to the method proposed above.

Referring to FIG. 15, the UE receives period information for CSI reporting from the BS (S1502). Then, the UE generates A/N information about one or more cells from among a plurality of cells for transmission in an uplink subframe n (S1504) and performs an operation for transmitting CSI in the uplink subframe n according to the period information (S1506). Here, when a specific condition is satisfied, the CSI and A/N information can be transmitted through the same physical channel (e.g. PUCCH format 2/2a/2b) in the uplink subframe n (S1508). If the specific condition is not satisfied, only the A/N information can be transmitted in the uplink subframe n using channel selection. The specific condition includes Mp=0. Mp represents the number of downlink subframes corresponding to the uplink subframe n. The specific condition further includes a case in which the A/N information is composed of only A/N for DL data received through a PCell.

Embodiment 3: Resource Allocation for PUCCH Format 3

In LTE-A, A/N can be transmitted using PUCCH format 3 when two or more CCs having the same TDD DL-UL configuration are aggregated (PUCCH format 3 mode).

Figure 16:
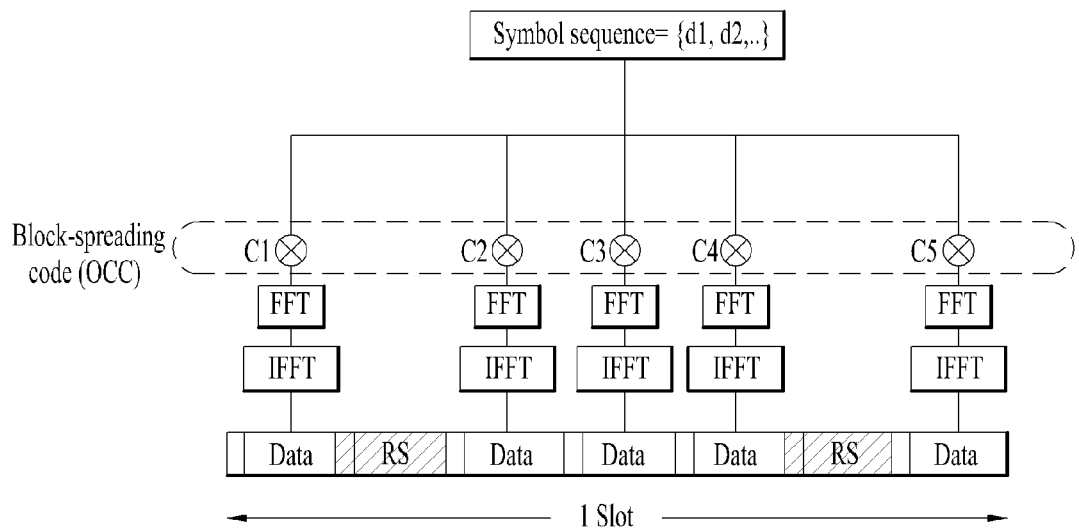
FIG. 16 illustrates PUCCH format 3 at a slot level.

FIG. 16 illustrates a slot level PUCCH format 3 structure. In PUCCH format 3, a plurality of A/N information is transmitted through joint coding (e.g. Reed-Muller coding, Tail-biting convolutional coding, etc.), block spreading and SC-FDMA modulation.

Referring to FIG. 16, a symbol sequence is transmitted over the frequency domain and orthogonal cover code (OCC) based time-domain spreading is applied to the symbol sequence. Control signals of a plurality of UEs can be multiplexed to the same RB using an OCC. Specifically, 5 SC-FDMA symbols (i.e. a UCI data part) are generated from the symbol sequence {d1, d2, . . . } using a length-5 OCC (C1, C2, C3, C4, C5). Here, the symbol sequence {d1, d2, . . . } can refer to a modulation symbol sequence or a codeword bit sequence.

LTE-A considers the following PUCCH resource allocation method when the PUCCH format 3 mode is set irrespective of M and whether or not cross-CC scheduling is used.

■ Case in which only a PDCCH that schedules a PCC and corresponds to an initial DAI value is received A/N transmission is performed through an implicit PUCCH (format 1a/1b) linked to the PDCCH (which is referred to as fallback PUCCH transmission for convenience). The PUCCH resource is referred to as a fallback PUCCH for convenience).

■ Case in which at least one of a PDCCH that schedules the PCC and corresponds to a DAI value rather than the initial value and a PDCCH that schedules an SCC is received A/N transmission is performed through PUCCH format 3 allocated through RRC and determined by an ARI. Specifically, only a TPC field in the PDCCH that schedules the PCC and corresponds to the initial DAI value is used for power control whereas TPC fields in other PDCCHs (i.e. the PDCCH that schedules the PCC and corresponds to a DAI value rather than the initial value and the PDCCH that schedules the SCC) are used for an ARI that indicates one of a plurality of PUCCH format 3 resources allocated through RRC.

A description will be given of a fallback PUCCH resource allocation method for PUCCH format 3 based A/N transmission when plural CCs having different TDD DL-UL configurations are aggregated. Similarly to embodiment 1, an A/N-DL SF index of a PCC, which is set at specific PCC UL SF timing based on Ref-Cfg, is defined as an R-SF index and an A/N-DL SF index set at the PCC UL SF timing when A/N timing of Ref-Cfg is applied is defined as an O-SF index. The number of R-SF indices identical to the O-SF index is defined as Ns and the number of R-SF indices different from the O-SF index is defined as Nd. Here, implicit PUCCHs are defined in PCC UL SFs (corresponding Ns PCC DL SF indices) for the Ns PCC DL SF indices, whereas implicit PUCCHs are not defined in PCC UL SFs (corresponding to Nd PCC DL SF indices) for Nd PCC DL SF indices.

In the present embodiment, an implicit PUCCH resource (linked to a PDCCH that schedules a PCC DL SF corresponding to an R-SF index identical to the O-SF index) is reserved for the PCC DL SF and an explicit PUCCH resource is reserved (through RRC signaling) for a PCC DL SF corresponding to an R-SF index different from the O-SF index according to a fundamental rule of PUCCH resource allocation. A PUCCH resource considered/used as a fallback PUCCH from among the reserved resources can be a resource linked/corresponding to an SF scheduled by a PDCCH having a specific DAI value (e.g. initial value).

Figure 17:
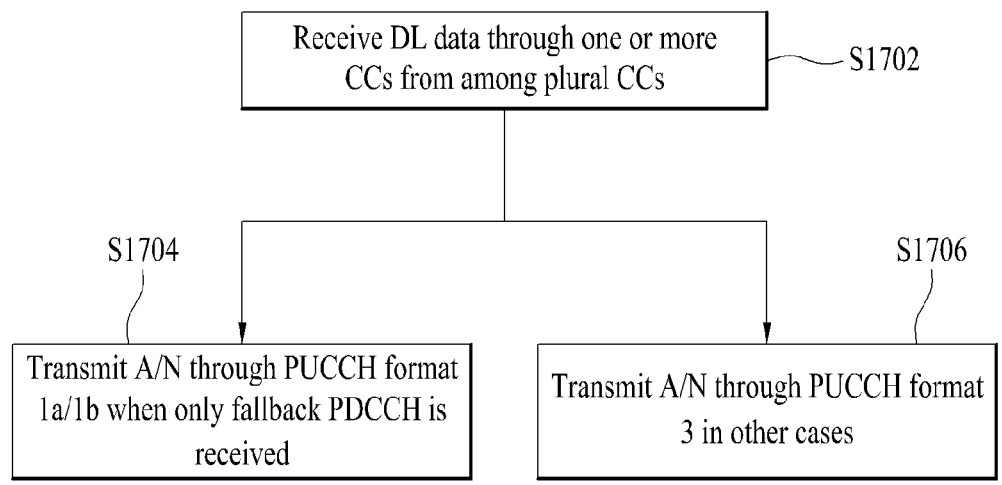
FIG. 17 illustrates an A/N transmission procedure according to another embodiment of the present invention.

FIG. 17 illustrates an A/N transmission procedure according to the above-described method. Referring to FIG. 17, the UE receives DL data through one or more CCs from among a plurality of CCs (S1702). The UE transmits A/N through PUCCH format 1a/1b upon receiving only a fallback PDCCH (S1704). Here, the fallback PDCCH includes a PDCCH having a DAI value corresponding to the initial value. In other cases (that is, when the fallback PDCCH is not received or other PDCCHs are received along with the fallback PDCCH), the UE transmits A/N through PUCCH format 3 according to a set A/N transmission mode. Here, for candidate resources (i.e. PUCCH 1a/1b resources) for a fallback PUCCH, an implicit PUCCH resource can be reserved for an XCC DL SF corresponding to an R-SF index identical to the O-SF index and an explicit PUCCH resource can be reserved for an XCC DL SF corresponding to an R-SF index different from the O-SF index, as described above.

More specifically, a method for determining a fallback PUCCH resource with reference to Ns and Nd is proposed. A PDCCH that schedules a PCC and has an initial DAI value is referred to as a fallback PDCCH.

■ Case in which only a fallback PDCCH is received when Nd=0

A/N is transmitted through an implicit PUCCH (format 1a/1b) resource linked to the corresponding PDCCH.

■ Case in which only a fallback PDCCH is received when Ns=0

A/N is transmitted through an explicit PUCCH (format 1a/1b) resource separately allocated through RRC irrespective of a PCC DL SF in which the corresponding PDCCH is received.

■ Case in which only a fallback PDCCH is received when Ns>0 and Nd>0 when the corresponding PDCCH is received through a PCC DL SF corresponding to the O-SF index
A/N is transmitted through an implicit PUCCH (format 1a/1b) resource linked to the corresponding PDCCH.

when the corresponding PDCCH is received through a PCC DL SF that does not correspond to the O-SF index
A/N is transmitted through an explicit PUCCH (format 1a/1b) resource allocated through RRC.

Furthermore, the following two resource allocation methods (methods 2-1 and 2-2) can be additionally considered. For reference, according to a fundamental rule of method 2-1, an implicit PUCCH resource (linked to a PDCCH that schedules a PCC DL SF corresponding to an R-SF index identical to the O-SF index) for the PCC DL SF when an R-SF index different from the O-SF index is not present, whereas an explicit PUCCH resource is reserved (through RRC signaling) for PCC DL SFs corresponding to R-SF indices when one or more R-SF indices different from the O-SF index are present.

[Method 2-1]

■ Case in which only a fallback PDCCH is received when Nd=0

A/N is transmitted through an implicit PUCCH (format 1a/1b) resource linked to the corresponding PDCCH.

■ Case in which only a fallback PDCCH is received when Nd>0

A/N is transmitted through an explicit PUCCH (format 1a/1b) resource separately allocated through RRC irrespective of a PCC DL SF in which the corresponding PDCCH is received.

[Method 2-2]

■ Case in which only a fallback PDCCH is received irrespective of Nd

A/N is transmitted through an explicit PUCCH (format 1a/1b) resource separately allocated through RRC irrespective of a PCC DL SF in which the corresponding PDCCH is received.

Furthermore, the following two resource allocation methods (methods 2-3 and 2-4) can be additionally considered. For reference, according to the basic rule of method 2-3, an implicit PUCCH resource (linked to a PDCCH that schedules PCC DL SFs corresponding to an R-SF index) for the PCC DL SFs when Ref-Cfg of a PCC is set to PCC-Cfg, whereas an explicit PUCCH resource is reserved (through RRC signaling) for all PCC DL SFs corresponding to the R-SF index when Ref-Cfg of the PCC is set to DL-UL Cfg rather than PCC-Cfg.

[Method 2-3]
- Case in which only a fallback PDCCH is received when Ref-Cfg of a PCC is set to PCC-Cfg
  A/N is transmitted through an implicit PUCCH (format 1a/1b) resource linked to the corresponding PDCCH.
- Case in which only a fallback PDCCH is received when Ref-Cfg of the PCC is set to DL-UL Cfg rather than PCC-Cfg.
  A/N is transmitted through an explicit PUCCH (format 1a/1b) resource separately allocated through RRC irrespective of a PCC DL SF in which the corresponding PDCCH is received.

[Method 2-4]
- Case in which only a fallback PDCCH is received irrespective of Ref-Cfg of the PCC
  A/N is transmitted through an explicit PUCCH (format 1a/1b) resource separately allocated through RRC irrespective of a PCC DL SF in which the corresponding PDCCH is received.

In addition, the following two resource allocation schemes can be considered to operate explicit PUCCH (format 1a/1b) resources additionally allocated to the PCC.
- Alt 2-1: a plurality of explicit PUCCH resources is pre-allocated through RRC and one of the plurality of explicit PUCCH resources, indicated by an ARI, is determined as a PUCCH format resource. The ARI can be signaled using a TPC field in the fallback PDCCH.
- Alt 2-2: only one explicit PUCCH resource is allocated through RRC and is determined as a fallback PUCCH all the time without reference to the ARI. In this case, the TPC field in the fallback PDCCH is used for power control.

Alternatively, a method of transmitting A/N using PUCCH format 3 (instead of PUCCH format 1a/1b) even when only a fallback PDCCH is received can be considered. More specifically, use of PUCCH format 1 replacing an explicit PUCCH (format 1a/1b) is limited to a case in which the explicit PUCCH (format 1a/1b) is used in the above-described schemes. In this case, TPC fields in all PDCCHs (including the fallback PDCCH) can be used for an ARI that indicates one of a plurality of PUCCH format 3 resources allocated through RRC.

A special SF (S SF) (corresponding to S SF configuration #0 in Table 2, for example) including a DwPTS period composed of N (e.g. 3) or fewer OFDM symbols can be allocated. In this case, when the S SF is set to a PCC (i.e. PCell), a PDCCH (that requires only 1-bit A/N feedback) that indicates SPS release can be transmitted through the S SF. On the contrary, when the S SF is set to an SCC (i.e. SCell), PDCCH/DL data that requires A/N feedback cannot be transmitted through the S SF. Accordingly, when the S SF (referred to as a shortest S SF) having a short DwPTS period is set to a PCell in application of the proposed method, A/N corresponding to the shortest S SF can be allocated 1 bit at all times irrespective of a value Ntb set to the PCell or the shortest S SF can be excluded from A/N-DL SFs for determining M. In this case, the UE can consider that the PDCCH indicating SPS release is not transmitted through the shortest S SF (and thus a PDCCH monitoring process (e.g. blind decoding) can be omitted in the PCell S SF). When the shortest S SF is set to an SCell, the shortest S SF can be excluded from the A/N-DL SFs for determining M. In addition, when the PCell and SCell have the same TDD DL-UL configuration, the proposed methods are applicable based on the above-described scheme (of allocating 1 bit to A/N corresponding to the shortest S SF at all times or excluding the shortest S SF from the A/N-DL SFs (for determining M)) if the shortest S SF is set to the PCell and SCell.

Embodiment 4: Simultaneous Transmission of PUCCH Format 3 Based A/N and Periodic CSI In LTE-A TDD, when A/N transmission timing and periodic CSI transmission timing correspond to the same UL SF while an A/N transmission mode is set to PUCCH format 3, the A/N and CSI are simultaneously transmitted using PUCCH format 2/2a/2b if the A/N satisfies a specific condition and transmission of the CSI is dropped and, otherwise, only the A/N is transmitted through PUCCH format 3. The specific condition includes a case in which the A/N is composed of only A/N for DL data (i.e. DL data having no PDCCH corresponding thereto) (e.g. SPS PDSCH) corresponding to a specific DAI value (e.g. initial DAI value (e.g. 1)) or having no DAI value corresponding thereto.

When plural cells having different UL-DL configurations are aggregated, M for the PCell may be 0. In this case, according to a conventional method (of determining whether or not to simultaneously transmit A/N and CSI according to whether only specific A/N for the PCell is present or not), the CSI is unconditionally dropped since DL data cannot be received through the PCell. Accordingly, when M with respect to the PCell is 0, the target of the specific conditions for determining whether to simultaneously transmit A/N and CSI may be changed from A/N for the PCell to specific A/N for a specific SCell (since A/N corresponding to the PCell is not present). Therefore, when A/N transmission timing and CSI transmission timing correspond to the same UL SF in the PUCCH format 3 mode and M with respect to the PCell corresponding to the UL SF is 0, the target of the specific conditions for simultaneous transmission of A/N and CSI is changed to specific A/N for a specific SCell. Specifically, A/N and CSI are simultaneously transmitted using PUCCH format 2/2a/2b if the A/N is composed of only A/N for DL data corresponding to a specific DAI value (e.g. an initial value (e.g. 1)) or having no DAI value corresponding thereto (i.e. having no PDCCH corresponding thereto), received through the specific SCell, whereas CSI transmission is dropped and only the A/N is transmitted through PUCCH format 3 if not. Here, the specific SCell may be an SCell corresponding to the lowest cell index (e.g. ServCellIndex or SCellIndex). In addition, the specific SCell may be an SCell corresponding to the lowest cell index (e.g. ServCellIndex or SCellIndex) from among SCells having non-zero values M with respect to a corresponding UL SF. A TPC field in a PDCCH that schedules an A/N-DL SF of the specific SCell corresponding to the UL SF and corresponds to the initial DIA value (e.g. 1) can be used for power control (instead of ARI signaling).

The above-described method can be limited to operations in which simultaneous transmission of A/N and SCI is permitted through higher layer (e.g. RRC) signaling.

Figure 18:
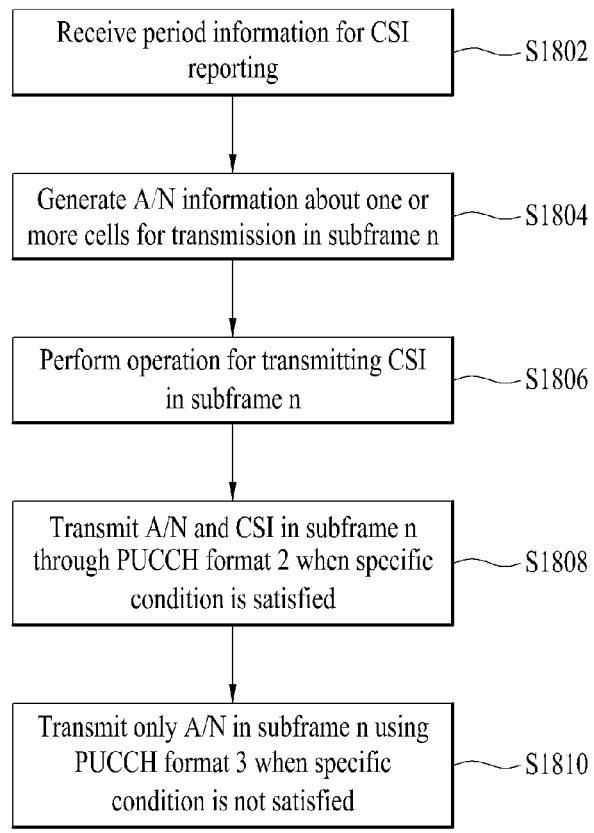
FIG. 18 illustrates an A/N transmission procedure according to another embodiment of the present invention.

FIG. 18 illustrates a procedure of transmitting A/N and CSI according to the above-described method.

Referring to FIG. 18, the UE receives period information for CSI reporting from the BS (S1802). Then, the UE generates A/N information about one or more cells from among a plurality of cells for transmission in an uplink subframe n (S1804) and transmits CSI in the uplink subframe n according to the period information (S1806). Here, when a specific condition is satisfied, the CSI and A/N information can be transmitted through the same physical channel (e.g. PUCCH format 2/2a/2b) in the uplink subframe n (S1508). If the specific condition is not satisfied, only the A/N information can be transmitted in the uplink subframe n using PUCCH format 3 (S1810). The specific condition includes a case in which Mp=0 A/N information is composed of only A/N for specific DL data received through a specific SCell. Mp represents the number of downlink subframes corresponding to the uplink subframe n and the specific DL data includes DL data corresponding to an initial DAI value or having no DAI value corresponding thereto. The specific condition further includes a case in which Mp≠0 and the A/N information is composed of A/N for specific DL data received through a PCell. The specific DL data includes DL data corresponding to the initial DAI value or having no DAI value corresponding thereto.

Figure 19:
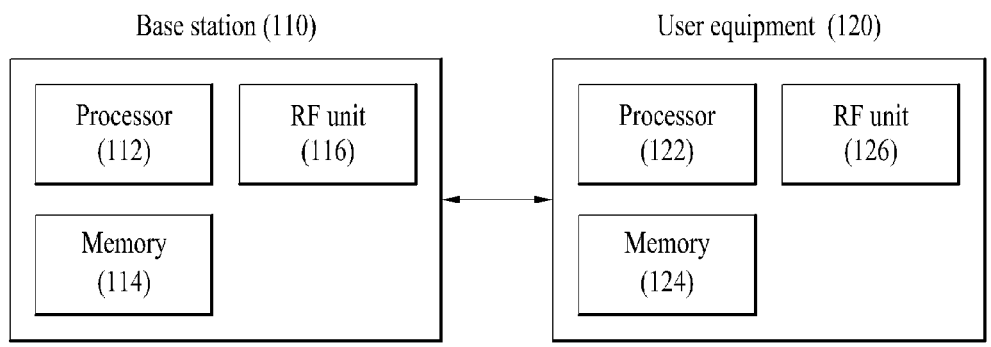
FIG. 19 illustrates a BS and a UE applicable to embodiments of the present invention.

FIG. 19 illustrates a BS and UE applicable to embodiments of the present invention. In the case of a system including a relay, the BS or UE can be replaced by the relay.

Referring to FIG. 19, a wireless communication system includes a BS 110 and a UE 120. The BS includes a processor 112, a memory 114, and an RF unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been given centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication devices such as a UE, a relay, a BS, etc.

The invention claimed is:

1. A method for transmitting uplink control information in a wireless communication system supporting carrier aggregation and operating in Time Division Duplex (TDD), the method comprising:

receiving period information for Channel Status Information (CSI) reporting;

generating acknowledgement/negative acknowledgement (A/N) information about one or more cells from among a plurality of cells for transmission in an uplink subframe n; and when the CSI is configured to be transmitted in the uplink subframe n based on the period information, the method further comprises:

transmitting the CSI and the A/N information through a same physical channel in the uplink subframe n when Mp is equal to zero and the A/N information only corresponds to first downlink data received through a secondary cell (SCell) among a plurality of SCells; and transmitting only the A/N information in the uplink subframe n when Mp is not equal to zero or the A/N information does not only correspond to the first downlink data, wherein Mp represents a number of downlink subframes of a primary cell (PCell) in association with the uplink subframe n.

2. The method according to claim 1, wherein the first downlink data includes downlink data corresponding to an initial downlink assignment index (DAI) value or having no DAI value corresponding thereto.

3. The method according to claim 1, wherein the SCell corresponds to an SCell having a lowest cell index from among the plurality of SCells.

4. The method according to claim 1, wherein the SCell corresponds to an SCell having a lowest cell index from among the plurality of SCells having numbers of downlink subframes corresponding to the subframe n, which are not zero.

5. The method according to claim 1, wherein, when the CSI and A/N information are transmitted through the same physical channel in the uplink subframe n, the CSI and A/N information are transmitted using a first physical uplink control channel (PUCCH) format.

6. The method according to claim 5, wherein, when only the A/N information is transmitted in the uplink subframe n, the A/N information is transmitted using a second PUCCH format different from the first PUCCH format.

7. The method according to claim 1, wherein the plurality of cells has different uplink (UL)-downlink (DL) configurations.

8. A communication device configured to transmit uplink control information in a wireless communication system supporting carrier aggregation and operating in Time Division Duplex (TDD), the communication device comprising:
a radio frequency (RF) unit; and
a processor,
wherein the processor is configured to:
receive period information for Channel Status Information (CSI) reporting,
generate acknowledgement/negative acknowledgement (A/N) information about one or more cells from among a plurality of cells for transmission in an uplink subframe n, and
when the CSI is configured to be transmitted in the uplink subframe n based on the period information, the processor is further configured to:
transmit the CSI and the A/N information through a same physical channel in the uplink subframe n when Mp is equal to zero and the A/N information only corresponds to first downlink data received through a secondary cell (SCell) among a plurality of SCells, and
transmit only the A/N information in the uplink subframe n when Mp is not equal to zero or the A/N information does not only correspond to first downlink data,
wherein Mp represents a number of downlink subframes of a primary cell (PCell) in association with the uplink subframe n.

9. The communication device according to claim 8, wherein the first downlink data includes downlink data corresponding to an initial downlink assignment index (DAI) value or having no DAI value corresponding thereto.

10. The communication device according to claim 8, wherein the SCell corresponds to an SCell having a lowest cell index from among the plurality of SCells.

11. The communication device according to claim 8, wherein the SCell corresponds to an SCell having a lowest cell index from among the plurality of SCells having numbers of downlink subframes corresponding to the subframe n, which are not zero.

12. The communication device according to claim 8, wherein, when the CSI and A/N information are transmitted through the same physical channel in the uplink subframe n, the CSI and A/N information are transmitted using a first physical uplink control channel (PUCCH) format.

13. The communication device according to claim 12, wherein, when only the A/N information is transmitted in the uplink subframe n, the A/N information is transmitted using a second PUCCH format different from the first PUCCH format.

14. The communication device according to claim 8, wherein the plurality of cells has different uplink (UL)-downlink (DL) configurations.

* * * * *